US010595327B2

(12) United States Patent
Sadek et al.

(10) Patent No.: US 10,595,327 B2
(45) Date of Patent: *Mar. 17, 2020

(54) INTER-ACCESS TERMINAL UNBLOCKING AND ENHANCED CONTENTION FOR CO-EXISTENCE ON A SHARED COMMUNICATION MEDIUM

(71) Applicant: QUALCOMM Incorporated, San Diego, CA (US)

(72) Inventors: Ahmed Sadek, San Diego, CA (US); Nachiappan Valliappan, San Diego, CA (US); Tamer Kadous, San Diego, CA (US); Chirag Patel, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/383,541

(22) Filed: Apr. 12, 2019

(65) Prior Publication Data

US 2019/0239243 A1    Aug. 1, 2019

Related U.S. Application Data

(63) Continuation of application No. 15/250,765, filed on Aug. 29, 2016, now Pat. No. 10,299,284.
(Continued)

(51) Int. Cl.
*H04W 72/12* (2009.01)
*H04W 16/14* (2009.01)
(Continued)

(52) U.S. Cl.
CPC ....... *H04W 72/1247* (2013.01); *H04L 5/0048* (2013.01); *H04L 5/14* (2013.01);
(Continued)

(58) Field of Classification Search
None
See application file for complete search history.

(56) References Cited

U.S. PATENT DOCUMENTS 7,907,576 B1    3/2011 Nicholas
8,331,299 B2    12/2012 Kim et al.
(Continued)

FOREIGN PATENT DOCUMENTS

WO    2011085403 A1    7/2011
WO    2014019213 A1    2/2014

OTHER PUBLICATIONS

International Search Report and Written Opinion—PCT/US2016/049767—ISA/EPO—dated Nov. 17, 2016.

*Primary Examiner* — Bunjob Jaroenchonwanit
(74) *Attorney, Agent, or Firm* — Muncy, Geissler, Olds & Lowe, P.C./QUALCOMM

(57) ABSTRACT

Techniques for managing access to a shared communication medium are disclosed. Scheduling grants may be sent to different access terminals for different sets of resources for uplink transmission on the communication medium. A series of re-contention gaps may be scheduled for access terminal contention within or between the different sets of resources. Uplink and downlink transmission on the communication medium may be silenced during each of the series of re-contention gaps. Moreover, an access terminal may receive a scheduling grant that allocates a set of resources to the access terminal for uplink transmission on a communication medium and contend for access to the communication medium based on the scheduling grant. The access terminal may then selectively transmit uplink traffic over the allocated set of resources based on the contending.

19 Claims, 15 Drawing Sheets

Related U.S. Application Data

(60) Provisional application No. 62/212,344, filed on Aug. 31, 2015, provisional application No. 62/212,096, filed on Aug. 31, 2015.

(51) Int. Cl.
*H04L 5/00* (2006.01)
*H04W 72/04* (2009.01)
*H04L 5/14* (2006.01)
*H04W 74/08* (2009.01)
*H04W 84/12* (2009.01)

(52) U.S. Cl.
CPC ....... *H04W 16/14* (2013.01); *H04W 72/0446* (2013.01); *H04W 72/0453* (2013.01); *H04W 74/0833* (2013.01); *H04W 84/12* (2013.01)

(56) References Cited

U.S. PATENT DOCUMENTS

| | | |
|---|---|---|
| 9,154,267 B2 | 10/2015 | He et al. |
| 9,787,447 B2 | 10/2017 | Li et al. |
| 10,299,284 B2 * | 5/2019 | Sadek ............... H04W 72/1247 |
| 2007/0248076 A1 | 10/2007 | Ji et al. |
| 2008/0159258 A1 | 7/2008 | Ji et al. |
| 2010/0002638 A1 | 1/2010 | Park et al. |
| 2010/0103913 A1 | 4/2010 | Sung et al. |
| 2011/0194502 A1 | 8/2011 | Sung et al. |
| 2012/0135763 A1 | 5/2012 | Johnsson et al. |
| 2013/0010668 A1 | 1/2013 | Lin et al. |
| 2014/0301373 A1 | 10/2014 | Cili et al. |
| 2015/0098397 A1 | 4/2015 | Damnjanovic et al. |
| 2016/0127997 A1 | 5/2016 | Ang et al. |
| 2016/0174215 A1 | 6/2016 | Zhang et al. |
| 2016/0278030 A1 | 9/2016 | Yi et al. |
| 2016/0381645 A1 | 12/2016 | Shanks et al. |
| 2017/0019909 A1 | 1/2017 | Si et al. |
| 2017/0027018 A1 | 1/2017 | Langereis et al. |
| 2017/0105207 A1 | 4/2017 | Fan et al. |
| 2017/0230970 A1 | 8/2017 | Kim et al. |
| 2017/0237533 A1 | 8/2017 | Lee, II et al. |
| 2017/0311343 A1 | 10/2017 | Chendamarai et al. |

* cited by examiner

INTER-ACCESS TERMINAL UNBLOCKING AND ENHANCED CONTENTION FOR CO-EXISTENCE ON A SHARED COMMUNICATION MEDIUM

CROSS-REFERENCE TO RELATED APPLICATIONS

The present Application for Patent is a continuation of patent application Ser. No. 15/250,765 entitled "INTER-ACCESS TERMINAL UNBLOCKING AND ENHANCED CONTENTION FOR CO-EXISTENCE ON A SHARED COMMUNICATION MEDIUM" filed Aug. 29, 2016, pending, assigned to the assignee hereof, and expressly incorporated by reference in its entirety, which is claims the benefit of U.S. Provisional Application No. 62/212,096, entitled "Inter-Access Terminal Unblocking for Co-Existence on a Shared Communication Medium," filed Aug. 31, 2015, and U.S. Provisional Application No. 62/212,344, entitled "Enhanced Contention Modes for Co-Existence on a Shared Communication Medium," filed Aug. 31, 2015, each assigned to the assignee hereof and expressly incorporated herein by reference in its entirety.

INTRODUCTION

Aspects of this disclosure relate generally to telecommunications, and more particularly to operations on a shared communication medium and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In cellular networks, "macro cell" access points provide connectivity and coverage to a large number of users over a certain geographical area. A macro network deployment is carefully planned, designed, and implemented to offer good coverage over the geographical region. To improve indoor or other specific geographic coverage, such as for residential homes and office buildings, additional "small cell," typically low-power access points have recently begun to be deployed to supplement conventional macro networks. Small cell access points may also provide incremental capacity growth, richer user experience, and so on.

Small cell LTE operations, for example, have been extended into the unlicensed frequency spectrum such as the Unlicensed National Information Infrastructure (U-NII) band used by Wireless Local Area Network (WLAN) technologies. This extension of small cell LTE operation is designed to increase spectral efficiency and hence capacity of the LTE system. However, it may also encroach on the operations of other Radio Access Technologies (RATs) that typically utilize the same unlicensed bands, most notably IEEE 802.11x WLAN technologies generally referred to as "Wi-Fi."

SUMMARY

The following summary is an overview provided solely to aid in the description of various aspects of the disclosure and is provided solely for illustration of the aspects and not limitation thereof.

In one example, a communication method is disclosed. The method may include, for example, sending a first scheduling grant to a first access terminal for a first set of resources for uplink transmission on a communication medium; sending a second scheduling grant to a second access terminal for a second set of resources for uplink transmission on the communication medium; scheduling a series of re-contention gaps for access terminal contention within or between the first set of resources and the second set of resources, wherein a corresponding schedule of the re-contention gaps is included in at least one of the first or second scheduling grants; and silencing uplink and downlink transmission on the communication medium during each of the series of re-contention gaps.

In another example, a communication apparatus is disclosed. The apparatus may include, for example, at least one transceiver, at least one processor, and at least one memory coupled to the at least one processor. The at least one transceiver may be configured to send a first scheduling grant to a first access terminal for a first set of resources for uplink transmission on a communication medium and to send a second scheduling grant to a second access terminal for a second set of resources for uplink transmission on the communication medium. The at least one processor and the at least one memory may be configured to schedule a series of re-contention gaps for access terminal contention within or between the first set of resources and the second set of resources, with a corresponding schedule of the re-contention gaps being included in at least one of the first or second scheduling grants, and silence uplink and downlink transmission on the communication medium during each of the series of re-contention gaps.

In another example, another communication apparatus is disclosed. The apparatus may include, for example, means for sending a first scheduling grant to a first access terminal for a first set of resources for uplink transmission on a communication medium; means for sending a second scheduling grant to a second access terminal for a second set of resources for uplink transmission on the communication medium; means for scheduling a series of re-contention gaps for access terminal contention within or between the first set of resources and the second set of resources, wherein a corresponding schedule of the re-contention gaps is included in at least one of the first or second scheduling grants; and means for silencing uplink and downlink transmission on the communication medium during each of the series of re-contention gaps.

In another example, a transitory or non-transitory computer-readable medium is disclosed. The computer-readable medium may include, for example, code for sending a first scheduling grant to a first access terminal for a first set of resources for uplink transmission on a communication medium; code for sending a second scheduling grant to a second access terminal for a second set of resources for uplink transmission on the communication medium; code for scheduling a series of re-contention gaps for access terminal contention within or between the first set of resources and the second set of resources, wherein a corresponding schedule of the re-contention gaps is included in at least one of the first or second scheduling grants; and code for silencing uplink and downlink transmission on the communication medium during each of the series of re-contention gaps.

In another example, another communication method is disclosed. The method may include, for example, receiving, at an access terminal from an access point, a scheduling grant that allocates a set of resources to the access terminal for uplink transmission on a communication medium; contending, by the access terminal, for access to the communication medium based on the scheduling grant; and selectively transmitting, from the access terminal to the access point, uplink traffic over the allocated set of resources based on the contending.

In another example, another communication apparatus is disclosed. The apparatus may include, for example, at least one transceiver, at least one processor, and at least one memory coupled to the at least one processor. The at least one transceiver may be configured to receive, at an access terminal from an access point, a scheduling grant that allocates a set of resources to the access terminal for uplink transmission on a communication medium. The at least one processor and the at least one memory may be configured to contend, by the access terminal, for access to the communication medium based on the scheduling grant. The at least one transceiver may be further configured to selectively transmit, from the access terminal to the access point, uplink traffic over the allocated set of resources based on the contending.

In another example, another communication apparatus is disclosed. The apparatus may include, for example, means for receiving, at an access terminal from an access point, a scheduling grant that allocates a set of resources to the access terminal for uplink transmission on a communication medium; means for contending, by the access terminal, for access to the communication medium based on the scheduling grant; and means for selectively transmitting, from the access terminal to the access point, uplink traffic over the allocated set of resources based on the contending.

In another example, a transitory or non-transitory computer-readable medium is disclosed. The computer-readable medium may include, for example, code for receiving, at an access terminal from an access point, a scheduling grant that allocates a set of resources to the access terminal for uplink transmission on a communication medium; code for contending, by the access terminal, for access to the communication medium based on the scheduling grant; and code for selectively transmitting, from the access terminal to the access point, uplink traffic over the allocated set of resources based on the contending.

In another example, another communication method is disclosed. The method may include, for example, scheduling a plurality of access terminals for transmission on a communication medium; setting one or more contention parameters for an access point to contend for access to the communication medium based on the number of access terminals being scheduled; and contending for access to the communication medium by the access point in accordance with the one or more contention parameters.

In another example, another communication apparatus is disclosed. The apparatus may include, for example, at least one transceiver, at least one processor, and at least one memory coupled to the at least one processor. The at least one processor and the at least one memory may be configured to schedule a plurality of access terminals for transmission on a communication medium, and set one or more contention parameters for an access point to contend for access to the communication medium based on the number of access terminals being scheduled. The at least one transceiver may be configured to contend for access to the communication medium by the access point in accordance with the one or more contention parameters.

In another example, another communication apparatus is disclosed. The apparatus may include, for example, means for scheduling a plurality of access terminals for transmission on a communication medium; means for setting one or more contention parameters for an access point to contend for access to the communication medium based on the number of access terminals being scheduled; and means for contending for access to the communication medium by the access point in accordance with the one or more contention parameters.

In another example, another transitory or non-transitory computer-readable medium is disclosed. The computer-readable medium may include, for example, code for scheduling a plurality of access terminals for transmission on a communication medium; code for setting one or more contention parameters for an access point to contend for access to the communication medium based on the number of access terminals being scheduled; and code for contending for access to the communication medium by the access point in accordance with the one or more contention parameters.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

The present disclosure relates generally to co-existence techniques for operation on a shared communication medium. To mitigate the potential for inter-access-terminal blocking under a time-based contention scheme that may be in effect for the shared communication medium, re-contention gaps may be used with different scheduling grant schemes and associated techniques. Multiple access terminals may accordingly be permitted to operate concurrently, on orthogonal frequency resources or in accordance with other multiplexing techniques provided by a given Radio Access Technology (RAT). As an example, a non-colliding grant scheme may be employed in which access terminals are scheduled concurrently but with a series of re-contention gaps. As another example, a colliding grant scheme may be employed in which access terminals are scheduled with overlapping time and frequency resources but are hierarchically prioritized.

A centralized-contention scheme where an access point contends for access to the shared communication medium on behalf of several access terminals may also be improved by different enhanced contention modes provided herein. For example, autonomous contention by the access terminals may be facilitated by advanced scheduling grants such as semi-persistent grants. This may improve both scheduling efficiency and proportional fairness during the contention process.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 1:
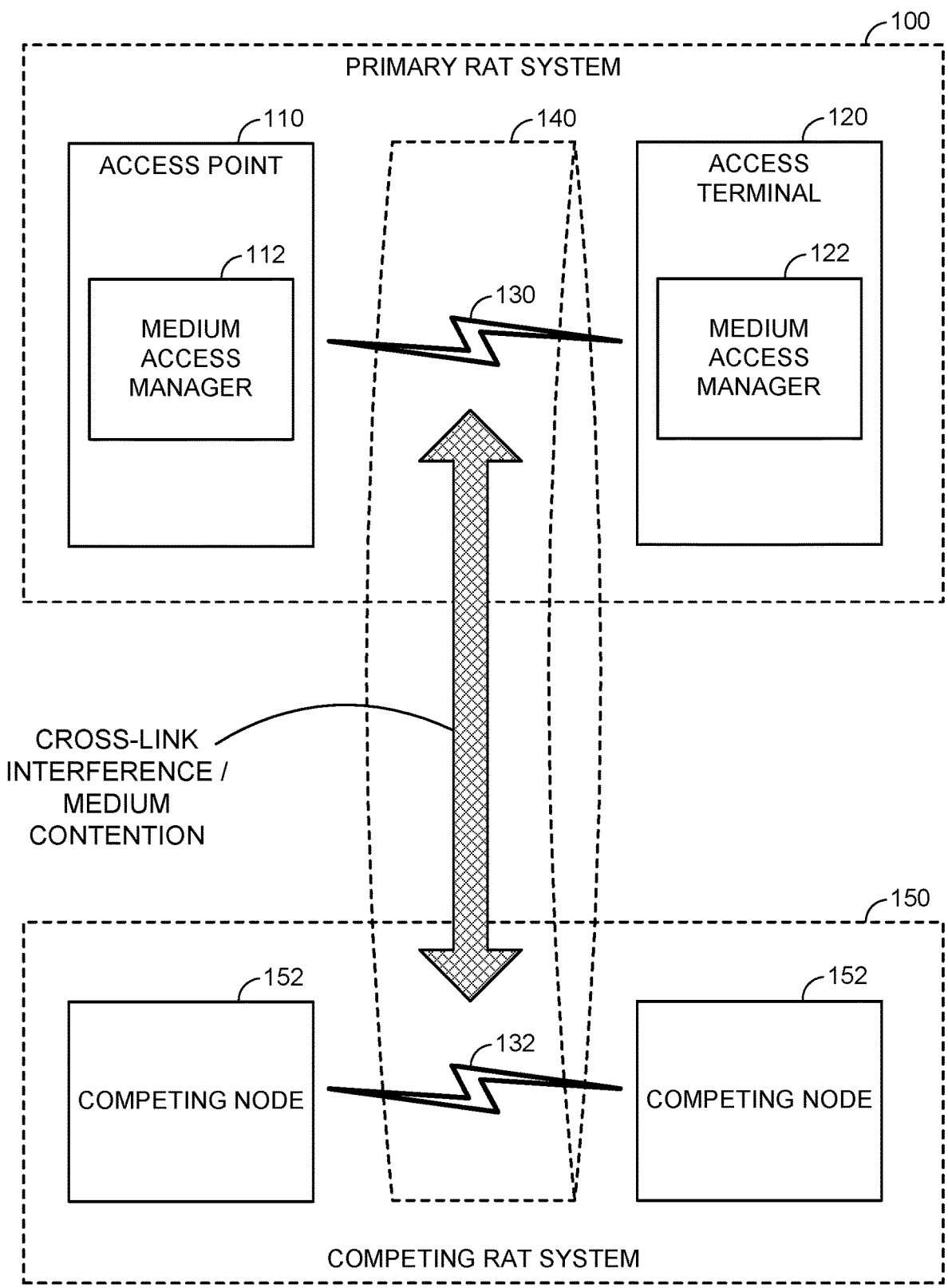
FIG. 1 is a system-level diagram illustrating an example wireless network environment.

FIG. 1 is a system-level diagram illustrating an example wireless network environment, shown by way of example as including a "primary" Radio Access Technology (RAT) system 100 and a "competing" RAT system 150. Each system may be composed of different wireless nodes generally capable of receiving and/or transmitting over a wireless link, including information related to various types of communication (e.g., voice, data, multimedia services, associated control signaling, etc.). The primary RAT system 100 is shown as including an access point 110 and an access terminal 120 in communication with each other over a wireless link 130. The competing RAT system 150 is shown as including two competing nodes 152 in communication with each other over a separate wireless link 132, and may similarly include one or more access points, access terminals, or other types of wireless nodes. As an example, the access point 110 and the access terminal 120 of the primary RAT system 100 may communicate via the wireless link 130 in accordance with Long Term Evolution (LTE) technology, while the competing nodes 152 of the competing RAT system 150 may communicate via the wireless link 132 in accordance with Wi-Fi technology. It will be appreciated that each system may support any number of wireless nodes distributed throughout a geographic region, with the illustrated entities being shown for illustration purposes only.

Unless otherwise noted, the terms "access terminal" and "access point" are not intended to be specific or limited to any particular RAT. In general, access terminals may be any wireless communication device allowing a user to communicate over a communications network (e.g., a mobile phone, router, personal computer, server, entertainment device, Internet of Things (IOT)/Internet of Everything (IOE) capable device, in-vehicle communication device, etc.), and may be alternatively referred to in different RAT environments as a User Device (UD), a Mobile Station (MS), a Subscriber Station (STA), a User Equipment (UE), etc. Similarly, an access point may operate according to one or several RATs in communicating with access terminals depending on the network in which the access point is deployed, and may be alternatively referred to as a Base Station (BS), a Network Node, a NodeB, an evolved NodeB (eNB), etc. Such an access point may correspond to a small cell access point, for example. "Small cells" generally refer to a class of low-powered access points that may include or be otherwise referred to as femto cells, pico cells, micro cells, Wireless Local Area Network (WLAN) access points, other small coverage area access points, etc. Small cells may be deployed to supplement macro cell coverage, which may cover a few blocks within a neighborhood or several square miles in a rural environment, thereby leading to improved signaling, incremental capacity growth, richer user experience, and so on.

Returning to FIG. 1, the wireless link 130 used by the primary RAT system 100 and the wireless link 132 used by the competing RAT system 150 may operate over a shared communication medium 140. A communication medium of this type may be composed of one or more frequency, time, and/or space communication resources (e.g., encompassing one or more channels across one or more carriers). As an example, the communication medium 140 may correspond to at least a portion of an unlicensed frequency band. Although different licensed frequency bands have been reserved for certain communications (e.g., by a government entity such as the Federal Communications Commission (FCC) in the United States), some systems, in particular those employing small cell access points, have extended operation into unlicensed frequency bands such as the Unlicensed National Information Infrastructure (U-NII) band used by WLAN technologies including Wi-Fi.

Due to the shared use of the communication medium 140, there is the potential for cross-link interference between the wireless link 130 and the wireless link 132. Further, some RATs and some jurisdictions may require contention or "Listen Before Talk (LBT)" for access to the communication medium 140. As an example, a Clear Channel Assessment (CCA) protocol may be used in which each device verifies via medium sensing the absence of other traffic on a shared communication medium before seizing (and in some cases reserving) the communication medium for its own transmissions. In some designs, the CCA protocol may include distinct CCA Preamble Detection (CCA-PD) and CCA Energy Detection (CCA-ED) mechanisms for yielding the communication medium to intra-RAT and inter-RAT traffic, respectively. The European Telecommunications Standards Institute (ETSI), for example, mandates contention for all devices regardless of their RAT on certain communication media such as unlicensed frequency bands.

As will be described in more detail below, the access point 110 and/or the access terminal 120 may be variously configured in accordance with the teachings herein to provide or otherwise support the inter-access terminal unblocking and advanced contention techniques discussed briefly above. For example, the access point 110 may include a medium access manager 112 and the access terminal 120 may include a medium access manager 122. The medium access manager 112 and/or the medium access manager 122 may be configured in different ways to manage access to the communication medium 140.

Figure 2:
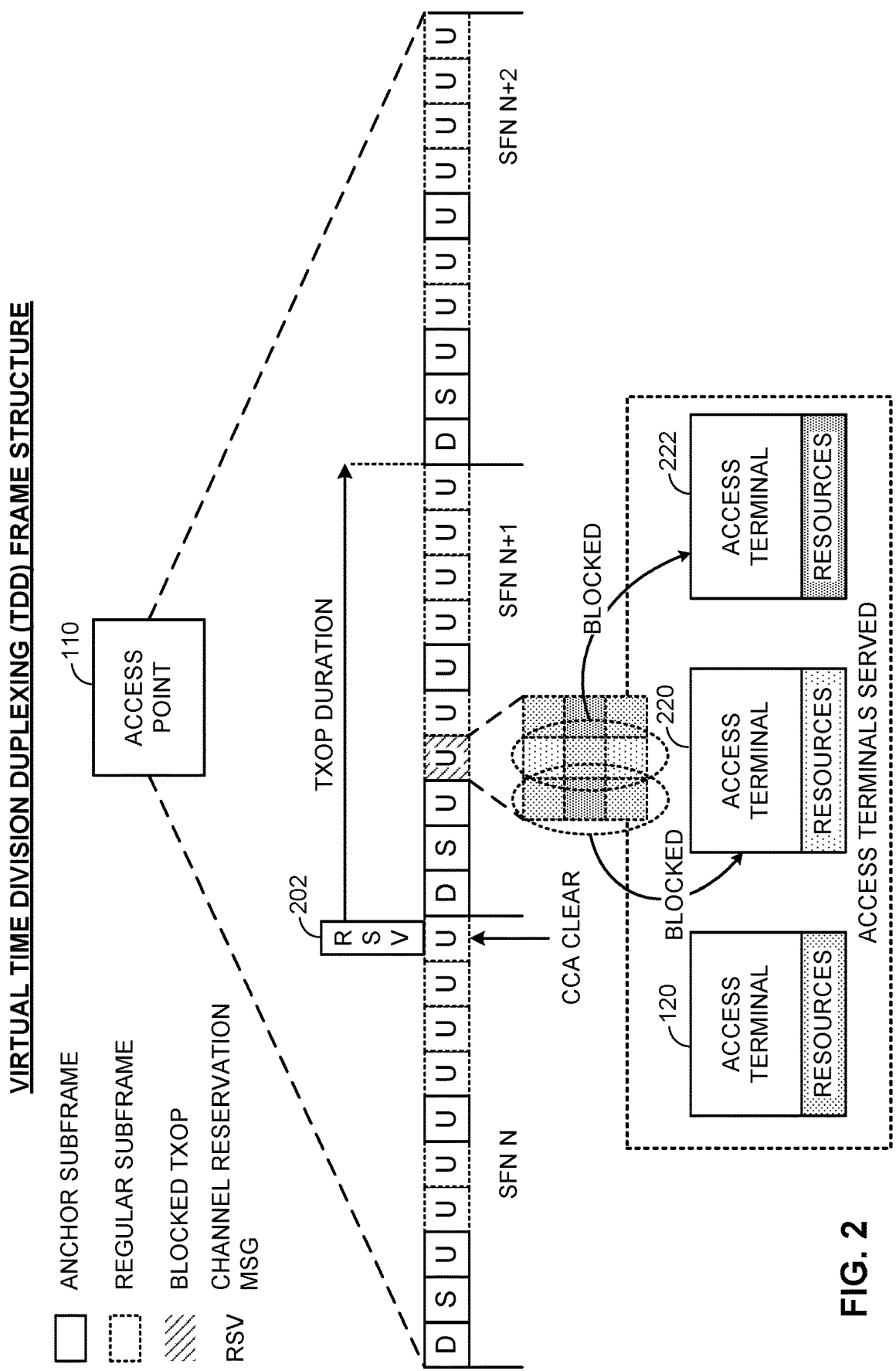
FIG. 2 illustrates an example virtual Time Division Duplexing (TDD) frame structure.

FIG. 2 illustrates an example virtual Time Division Duplexing (TDD) frame structure that may be implemented for the primary RAT system 100 on the communication medium 140 to facilitate contention-based access between the access point 110/access terminal 120 and the competing RAT system 150. For illustration purposes, the access point 110 is shown as providing communication services to additional access terminals as well, shown by way of example as access terminals 220 and 222.

The illustrated frame structure includes a series of radio frames (RFs) that are numbered in accordance with a System Frame Number (SFN) numerology (SFN N, N+1, N+2, etc.) and divided into respective subframes (SFs), which may also be numbered for reference (e.g., SF0, SF1, etc.). As an example, the LTE frame structure includes system frames that are divided into 1024 numbered radio frames composed of 10 subframes each, which together constitute an SFN cycle (e.g., lasting 10.24 s for 10 ms radio frames having 1 ms subframes). The use of a frame structure may provide more natural and efficient coordination among devices than more ad hoc signaling techniques.

The example frame structure of FIG. 2 is TDD in that each subframe may be variously operated at different times as a downlink (D), uplink (U), or special (S) subframe. In general, downlink subframes are reserved for transmitting downlink information from the access point 110 to the access terminal 120, uplink subframes are reserved for transmitting uplink information from the access terminal 120 to the access point 110, and special subframes may include a downlink portion and an uplink portion separated by a guard period. Different arrangements of downlink, uplink, and special subframes may be referred to as different TDD configurations. Returning to the LTE example above, the TDD variant of the LTE frame structure includes 7 TDD configurations (TDD Config 0 through TDD Config 6), with each configuration having a different arrangement of downlink, uplink, and special subframes. For example, some TDD configurations may have more downlink subframes and some may have more uplink subframes to accommodate different traffic scenarios. In the illustrated example of FIG. 2, a TDD configuration is employed that is similar to TDD Config 3 in LTE. The particular TDD configuration employed may be broadcast by the access point 110 using a System Information Block (SIB) message, a new physical channel to indicate the TDD frame format in the control region, or the like (e.g., a SIB-1 message in LTE).

Although each TDD configuration is different, there may be one or more subframes that are the same across all TDD configurations. These subframes are referred to herein as anchor subframes. Returning again to the LTE example above, the subframe SF0 is a downlink subframe, SF1 is a special subframe, SF2 is an uplink subframe, and SF5 is a downlink subframe in each radio frame across each of the TDD configurations TDD Config 0 through TDD Config 6. In the illustrated example, the anchor subframes similarly correspond to the subframes SF0, SF1, SF2, and SF5 of each radio frame, although it will be appreciated that the specific anchor carrier designations may vary across different systems.

The example frame structure of FIG. 2 is virtual in that each subframe may or may not be occupied by primary RAT signaling in any given instance due to the contention procedure for accessing the communication medium 140. In general, if the access point 110 or the access terminal 120 fails to win contention for a given subframe that subframe may be silenced.

At some point during the contention process, the communication medium 140 becomes clear (e.g., CCA Clear) and the access point 110, for example, seizes it. In order to reserve the communication medium 140 for itself for a Transmission Opportunity (TXOP) having a certain duration (e.g., one radio frame), the access point 110 may send a channel reservation message (RSV) 202 defined for the competing RAT system 150. The channel reservation message 202 may be transmitted over the communication medium 140 (e.g., via a competing-RAT-specific transceiver also belonging to the access point 110) to reserve the communication medium 140 for primary RAT operation. Example channel reservation messages may include, for example, 802.11a Data packets, Clear-to-Send-to-Self (CTS2S) messages, Request-to-Send (RTS) messages, Clear-to-Send (CTS) messages, Physical Layer Convergence Protocol (PLCP) headers (e.g., a legacy signal (L-SIG), a high throughput signal (HT-SIG), or very high throughput signal (VHT-SIG)), and the like for a competing Wi-Fi RAT, or other similar messages defined for other competing RATs of interest. The channel reservation message 202 may include a duration indication (e.g., a Network Allocation Vector (NAV)) corresponding to the duration of the target TXOP for which the access point 110 contended for access.

Returning to FIG. 2, as the number of access terminals served by the access point 110 grows, there is an increased potential for them to block each other. For example, even if the access terminals 120, 220, and 222 are scheduled by the access point 110 on orthogonal frequency resources in a given uplink subframe, as shown, their scheduled transmissions may still overlap in time. While there may be no actual conflict under the signaling protocol of the primary RAT, when the access terminals 120, 220, and 222 are in sufficient proximity of each other to receive signaling energy above a backoff threshold (e.g., a CCA-ED threshold, an LBT threshold, etc.), the first to transmit may block the other from utilizing its scheduled resources under a time-based contention scheme that may be in effect for the communication medium 140. In the illustrated example, the access terminals 120 and 222 are scheduled in the first (temporal) set of resource elements and therefore block the access terminal 220 from its subsequently scheduled use of the communication medium 140; the access terminal 120 is also scheduled in the next set of resource elements and therefore blocks the access terminal 222 from its subsequently scheduled use of the communication medium 140; and so on. This may even be the case when the TXOP reserved by the access point 110 spans the uplink subframes at issue because some contention schemes may require at least a reduced form of contention for so-called response messaging like uplink traffic (e.g., single-shot CCA).

Figure 3:
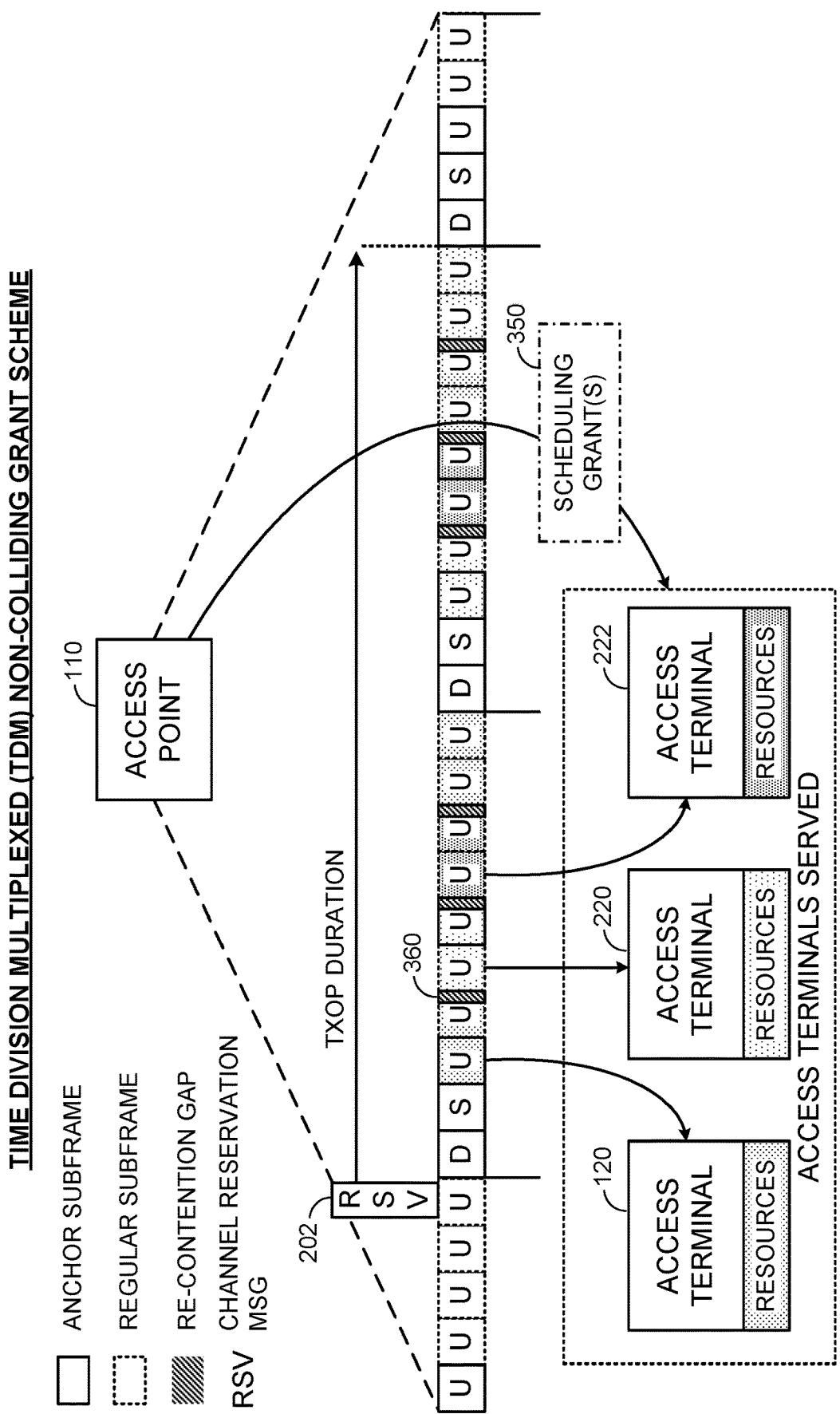
FIGS. 3-4 illustrate example non-colliding grant schemes in accordance with a virtual TDD frame structure.
Figure 4:
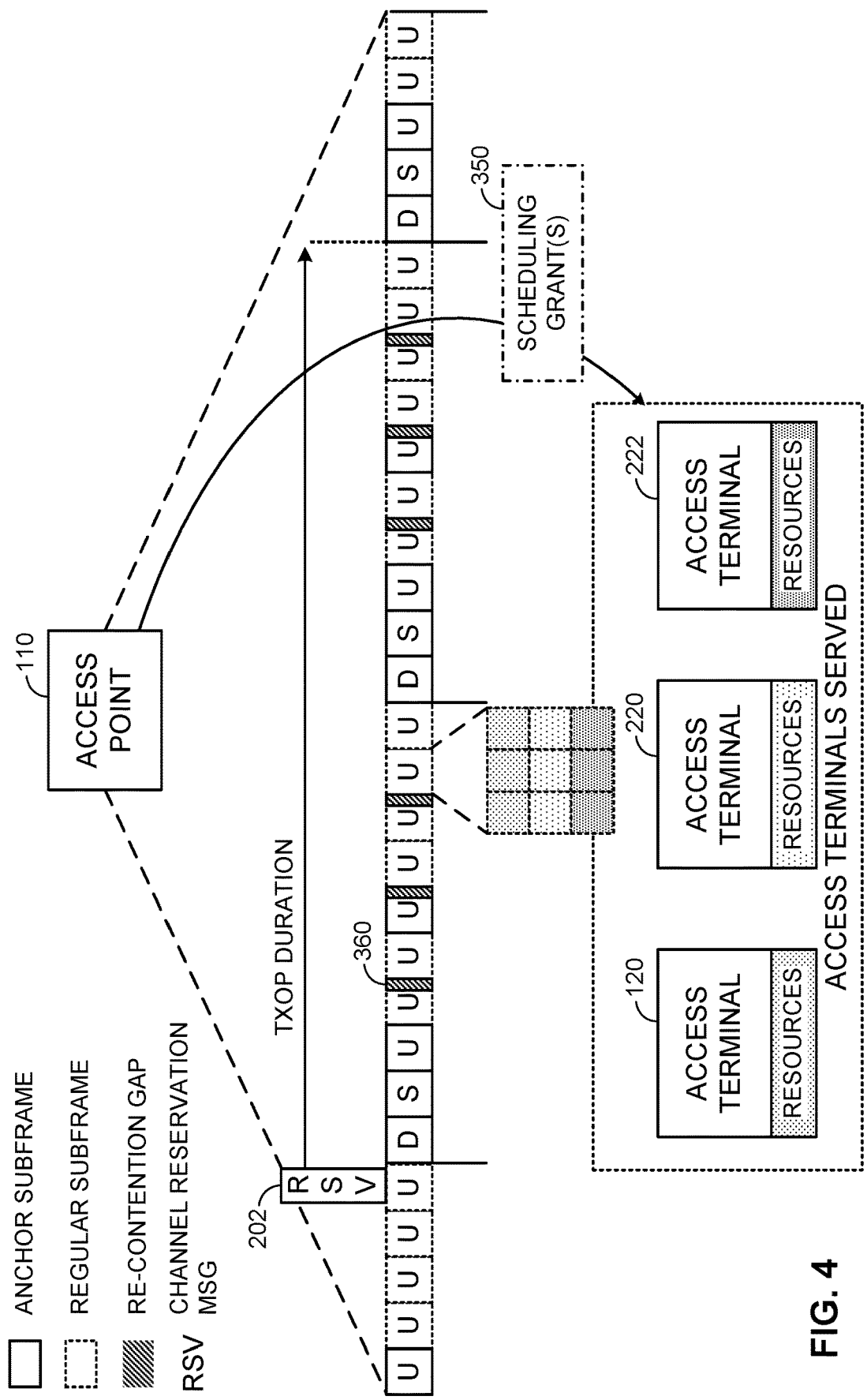

FIGS. 3-4 illustrate example non-colliding grant schemes in accordance with the virtual TDD frame structure of FIG. 2. In these examples, the access point 110 schedules uplink traffic resources for the access terminal 120, the access terminal 220, and the access terminal 222 via respective scheduling grants 350. The access point 110 also utilizes an uplink-heavy configuration for the virtual TDD frame structure and reserves the communication medium 140 for a longer period of time (e.g., 2-3 radio frames).

In the Time Division Multiplexed (TDM) non-colliding grant scheme of FIG. 3, the access point 110 may schedule the access terminals 120, 220, and 222 in distinct subframes or other resource units that are staggered in time. However, a priori time division multiplexing may lead to underutilization of uplink resources even if the access terminals 120, 220, and 222 do not block each other. For example, because resources are prescheduled without knowledge of the interference level experienced by each of the access terminals 120, 220, and 222, a nearby asynchronous, other-operator interferer, including other primary RAT systems as well as the competing RAT system 150, may block access to the communication medium 140 for a certain period of time that thereby disproportionately affects one of the access terminals 120, 220, and 222 scheduled during that time. In other words, a priori time division multiplexing may suffer from a lack of time-diversity. Accordingly, in other designs described in more detail below, the access point 110 may employ different non-colliding and even colliding grant schemes that make more efficient use of the resources available.

In the Frequency Division Multiplexed (FDM) non-colliding grant scheme of FIG. 4, to mitigate inter-access-terminal blocking during the clear channel assessment phase of the contention process, the access point 110 may schedule the access terminals 120, 220, and 222 concurrently in time but orthogonal in frequency. In this way, each of the access terminals 120, 220, and 222 may begin transmitting at the same time—that is, after the clear channel assessment phase is completed.

To mitigate inter-access terminal blocking due to start time staggering that may be caused by the competing RAT system 150, however, the access point 110 may also provide a series of short re-contention gaps 360, as shown, and silence uplink and downlink transmission on the communication medium during each of the series of re-contention gaps 360. If the access terminal 120, for example, were to be prevented from initially accessing the communication medium 140 by the competing RAT system 150, it may be then blocked by the other access terminals 220 and 222 from doing so at a later time within a contiguous group of uplink subframes. By providing the short re-contention gaps 360, primary RAT signaling may be temporarily suspended to allow the access terminal 120 to re-gain access to the communication medium 140. Following re-contention and clear channel assessment, each of the access terminals 120, 220, and 222 may begin transmitting again at the same time.

In the example of FIG. 3, the resources for the access terminals 120, 220, and 222 are time division multiplexed, and the re-contention gaps 360 are accordingly scheduled to occur between them (e.g., at or near a transition boundary between resources assigned to different access terminals). In the example of FIG. 4, the resources for the access terminals 120, 220, and 222 are frequency division multiplexed, and the re-contention gaps 360 are accordingly scheduled to occur within the temporally-overlapping resources (e.g., within an uplink subframe containing resources for each of the access terminals 120, 220, and 222).

The re-contention gaps 360 may be implemented in different ways. For example, the last one or more symbol periods of a given uplink subframe may be muted to provide a re-contention gap, such as by advertising a Sounding Reference Signal (SRS) gap during the uplink subframe and then refraining from configuring any of the access terminals 120, 220, or 222 for SRS transmission during this time. Ordinarily, SRS signaling is designated for a set of symbols of the last symbol period of an uplink subframe and used to help facilitate wideband uplink channel estimation for use in uplink power control, link adaptation, sub-band scheduling (e.g., frequency-dependent uplink scheduling), and so on. The access terminals 120, 220, and 222 may be configured to understand that any symbol period designated for SRS signaling may not be used for other transmissions, and these signal periods may therefore be silenced. A corresponding schedule of the re-contention gaps 360 may also be included in one or more of the scheduling grants 350 for access terminal coordination.

Figure 5:
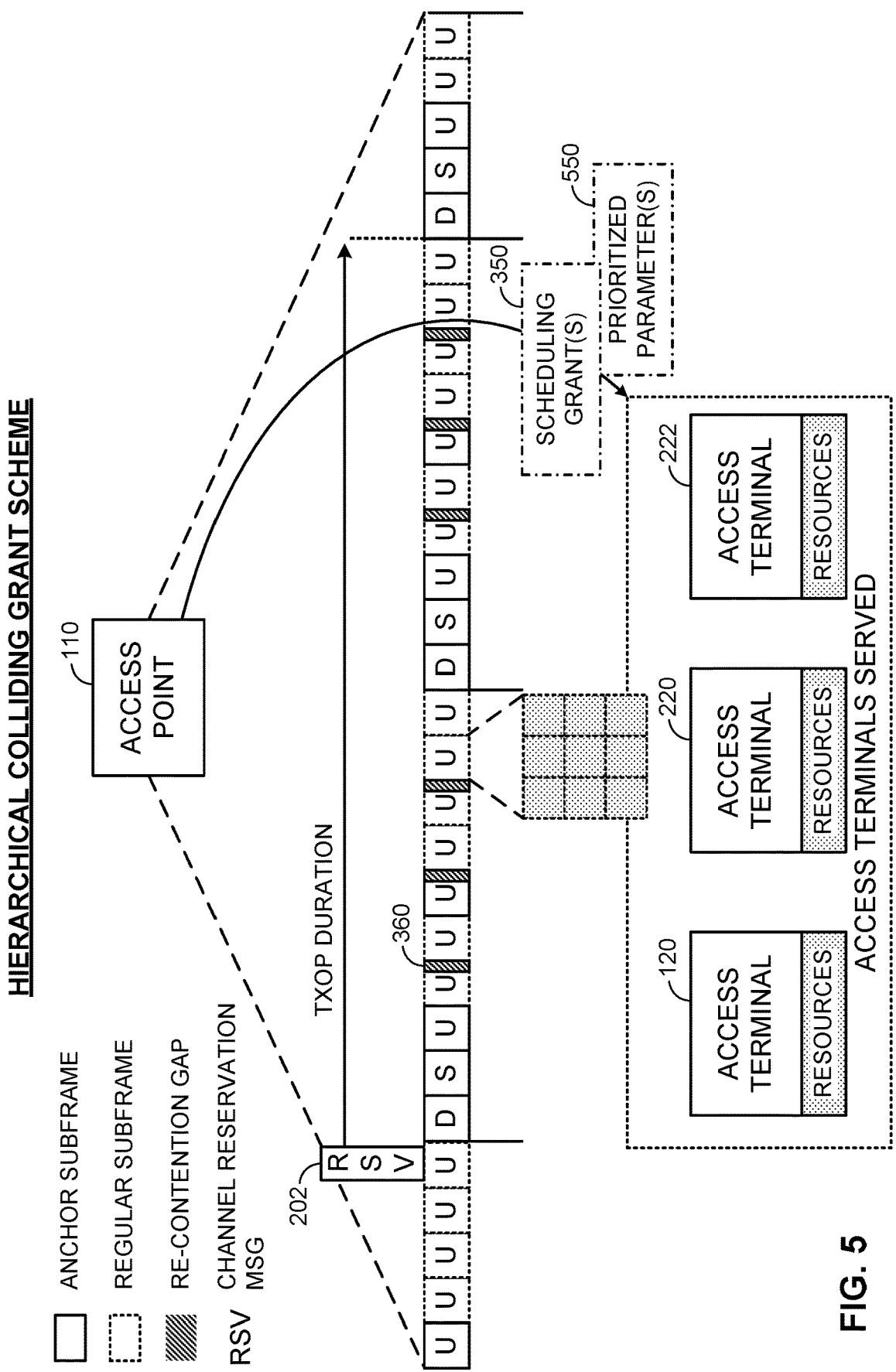
FIG. 5 illustrates an example hierarchical colliding grant scheme in accordance with a virtual TDD frame structure.

FIG. 5 illustrates an example hierarchical colliding grant scheme in accordance with the virtual TDD frame structure of FIG. 2. In this example, the access point 110 again schedules uplink traffic resources for the access terminal 120, the access terminal 220, and the access terminal 222 via respective scheduling grants 350. The access point 110 also again utilizes an uplink-heavy configuration for the virtual TDD frame structure and reserves the communication medium 140 for a longer period of time (e.g., 2-3 radio frames).

As shown, in this design, the access point 110 may schedule the access terminals 120, 220, and 222 together in resources that overlap in both time and frequency. That is, the access point 110 may send colliding scheduling grants to the access terminals 120, 220, and 222. To prevent actual collision, however, contention may be performed across the access terminals 120, 220, and 222 by establishing a hierarchy among them.

In some designs, contention may be performed by each of the access terminals 120, 220, and 222 autonomously, with the access point 110 promoting fairness (e.g., proportional fairness) by adjusting their respective contention parameters. For example, the access point 110 may prioritize the access terminal 120 over the other access terminals 220 and 222 with respect to contending for access to the communication medium 140 at a particular time (e.g., during at least one of the series of re-contention gaps 360). This may be achieved by assigning the access terminal 120 a set of one or more contention parameters 550 that define a reduced variable space (e.g., as bounded by a number q) for a randomly selected contention window size N (e.g., N as a random number between [1 . . . q]. Thus, on average, the access terminal 120 will select a smaller window size N and more frequently attempt to access the communication medium 140 ahead of the other access terminals 220 and 222. Once the access terminal 120 seizes the communication medium 140 and the corresponding scheduled resources, the other access terminals 220 and 222 may yield access to the access terminal 120. The yielding may be in response to observing the signaling energy of the access terminal 120, or by explicit message such as an associated access terminal access signature (e.g., a primary RAT reference signal or a secondary RAT channel reservation message). Even if the access terminal 120 is blocked by the competing RAT system 150, one of the other access terminals 220 and 222 may later seize the communication medium 140 in accordance with their own contention parameters, thereby ensuring that the scheduled resources do not go unutilized.

In other designs, contention may be controlled by the access point 110 directly in accordance with similar prioritized contention parameters. For example, the access point 110 may again prioritize the access terminal 120 over the other access terminals 220 and 222 by assigning it a reduced variable space, but the access point 110 may itself determine the contention window size N for each of the access terminals 120, 220, and 222 by random selection. The resultant contention window size may then be sent to each of the access terminals 120, 220, and 222, respectively. This design allows the access point 110 to internally resolve any conflicts between the access terminals 120, 220, and 222 (e.g., two or more selecting the same window size) before sending out the final contention window sizes, again promoting still further efficient use of the scheduled resources.

As is further illustrated in FIG. 5, short re-contention gaps 360 may be employed in conjunction with a hierarchical colliding grant scheme as well, to again allow the access terminals 120, 220, and 222 to promote proportional fairness and better resource utilization.

Figure 6:
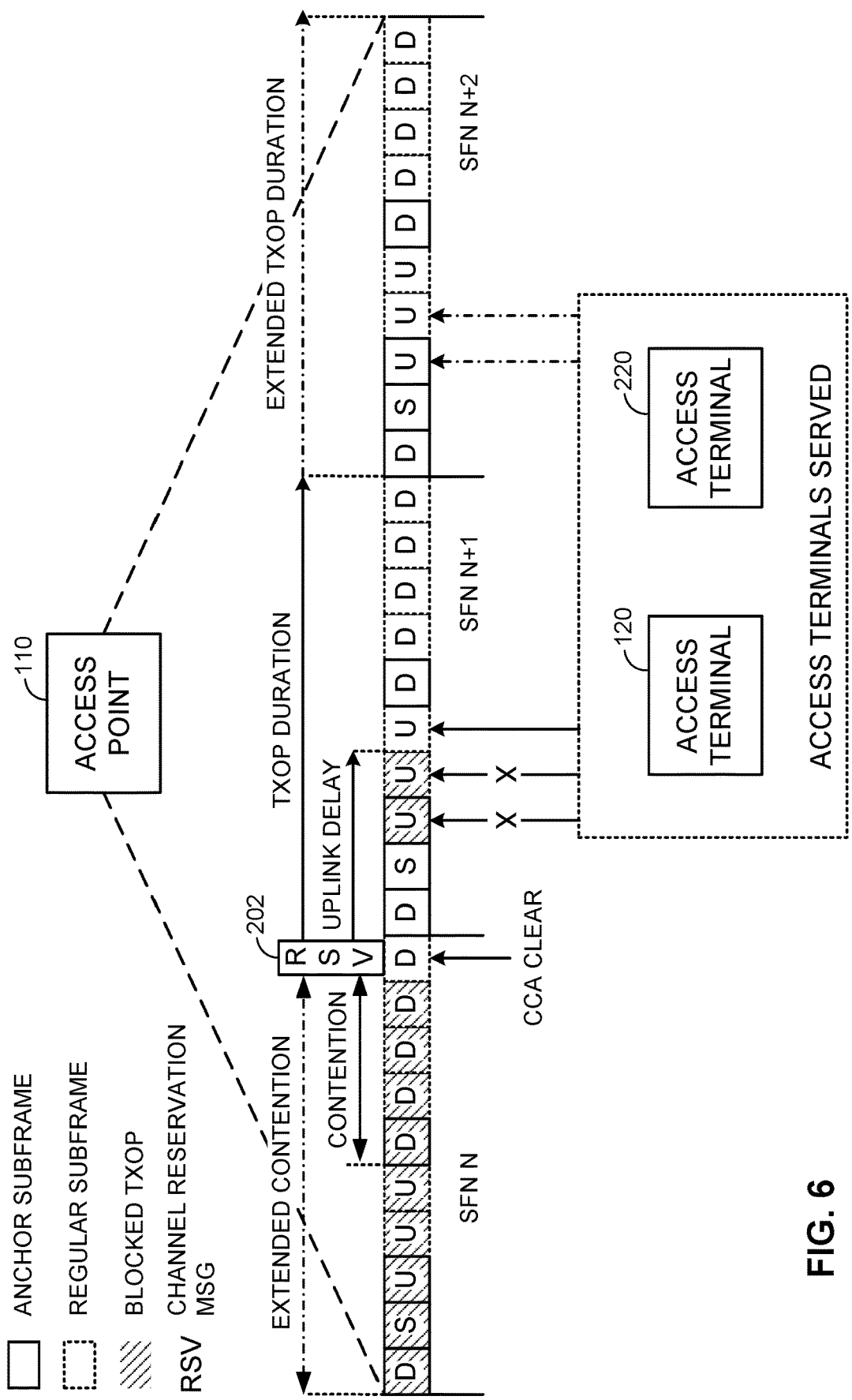
FIG. 6 illustrates an example of the contention process and potential for uplink delay on a virtual TDD frame structure.

FIG. 6 illustrates an example of the contention process and potential for uplink delay on a virtual TDD frame structure that may be implemented for the primary RAT system 100 on the communication medium 140. Similar to FIG. 2, for illustration purposes, the access point 110 is shown as providing communication services to the access terminal 120 as well as additional access terminals, shown again by way of example as the access terminal 220.

In some systems or scenarios, the access point 110 may attempt to reserve the communication medium 140 for the access terminal 120 as well as the access terminal 220. As the number of access terminals served by the access point 110 grows, however, this type of centralized reservation may become problematic. For example, the primary RAT system 100 and by extension the access point 110 may operate in accordance with LTE technology, IEEE 802.11ax technology, or another centralized-scheduling based protocol, whereas the competing RAT system 150 may operate in accordance with IEEE 802.11n, IEEE 802.11ac, or another distributed-access based protocol. By contending as a single entity, the access point 110 may be proportionally disadvantaged when competing against several devices from the competing RAT system 150 for access to the communication medium 140. Even though the access point 110 may represent the interests of multiple access terminals (e.g., both of the access terminals 120 and 220 being served), the access point 110 may only be able to gain access to the communication medium 140 in proportion to its single-entity status.

Moreover, although the communication medium 140 may be reserved for a given TXOP, processing delays may prevent the access point 110 from scheduling uplink traffic for a period of time following reservation. For example, the access point 110 may operate in accordance with LTE technology or another protocol that configures access terminals with a transition period to allow them to process scheduling information and prepare for transmission. Even if the access point 110 were to send a scheduling grant to the access terminals 120 and 220 at the earliest opportunity following reservation of the communication medium 140, the access terminals 120 and 220 may not be ready to transmit until a few subframes later. In the illustrated example of FIG. 6, the access terminals 120 and 220 are configured to be ready within four subframes of receiving a scheduling grant, which accordingly introduces an uplink delay. Thus, only the last uplink subframe of SFN N+1 is available for uplink traffic, with the first two uplink subframes being effectively blocked from use. While extending the TXOP duration for which the access point 110 is contending may help minimize the impact of such processing delays, as shown, the extended TXOP duration may require an extended contention process that introduces its own inefficiencies.

Figure 7:
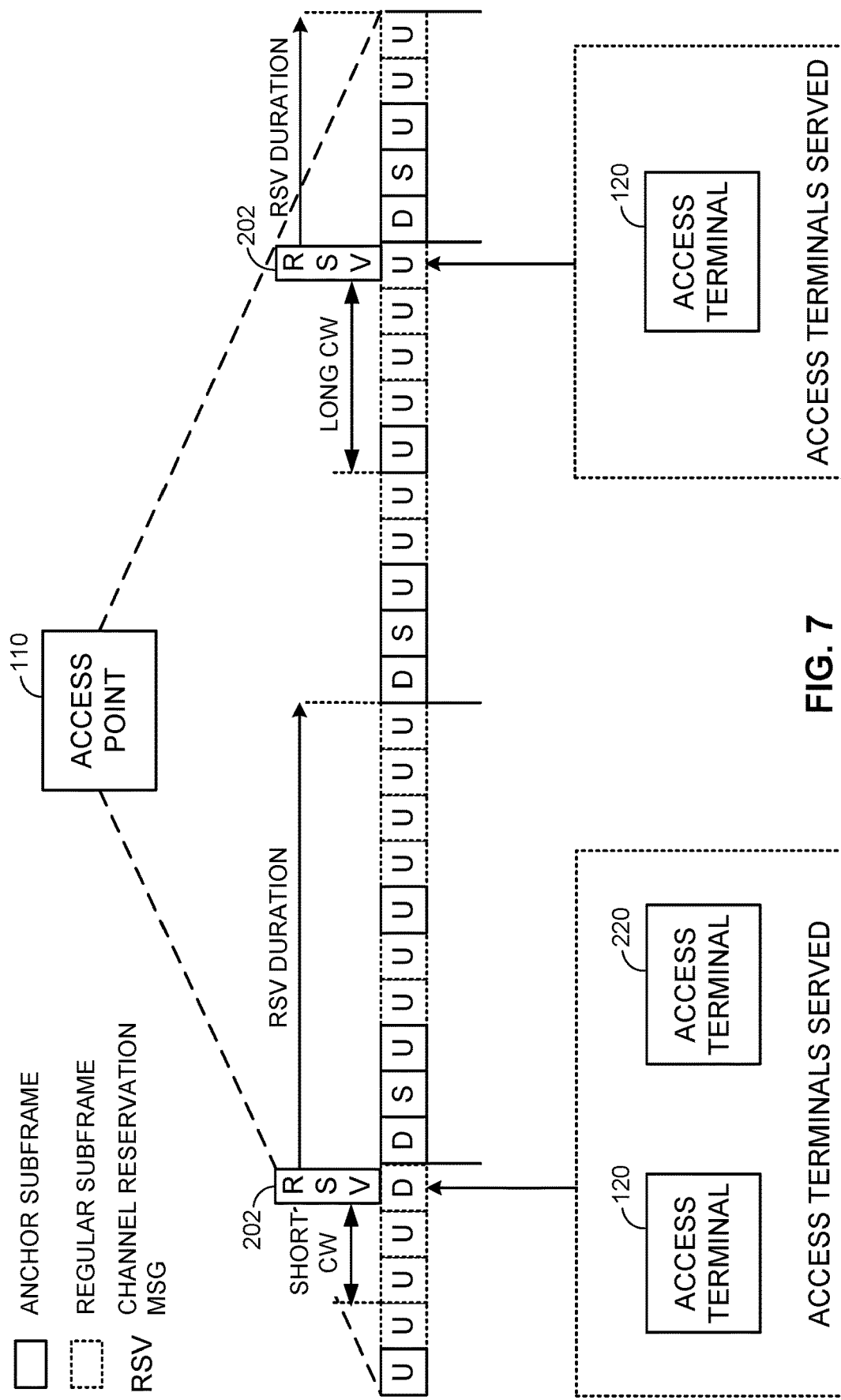
FIG. 7 illustrates an example of aggressive contention in accordance with a virtual TDD frame structure.

FIG. 7 illustrates an example of aggressive contention in accordance with a virtual TDD frame structure to facilitate fairness for a centralized-contention scheme. In this example, the access point 110 first contends for access to the communication medium 140 to schedule uplink traffic for both the access terminal 120 and the access terminal 220. At a later time, the access point 110 contends for access to the communication medium 140 to schedule uplink traffic for only the access terminal 120. It will be appreciated that the depiction of the aggressive contention techniques in accordance with the frame structure of FIG. 2 is provided here for illustration purposes only, and that the techniques may be applied or adapted when the access point 110 operates in accordance with any particular protocol such as LTE, IEEE 802.11ax, and so on.

To prioritize access to the communication medium 140 for a plurality of access terminals including the access terminals 120 and 220, the access point 110 may contend for access to the communication medium 140 using relatively aggressive contention parameters (e.g., controlling a contention window size, etc.). The contention parameters may be set based on the number of access terminals being served by the access point 110, with more aggressive contention parameters being set for a larger number of access terminals and less aggressive contention parameters being set for a comparatively smaller number of access terminals. To maintain fairness, the contention parameters may be further set based on the number of devices of the competing RAT system 150 that are simultaneously contending for access to the communication medium 140 (e.g., based on a proportion of the number of access terminals being served by the access point 110 in comparison to the total number of devices contending for access to the communication medium 140).

In the illustrated example, two TXOPs are shown with respective contention windows (CW). In a first contention period where the access point 110 contends for access to the communication medium 140 to schedule uplink traffic for both the access terminal 120 and the access terminal 220, the access point may invoke a relatively short contention window. This may be done in different ways for different systems, such as by directly selecting a short contention window, by selecting a reduced variable space for a randomly selected contention window, by selecting a reduced minimum value associated with the contention window, and so on. In a second contention period where the access point 110 contends for access to the communication medium 140 to schedule uplink traffic for only the access terminal 120, the access point 110 may invoke a longer contention window.

Figure 8:
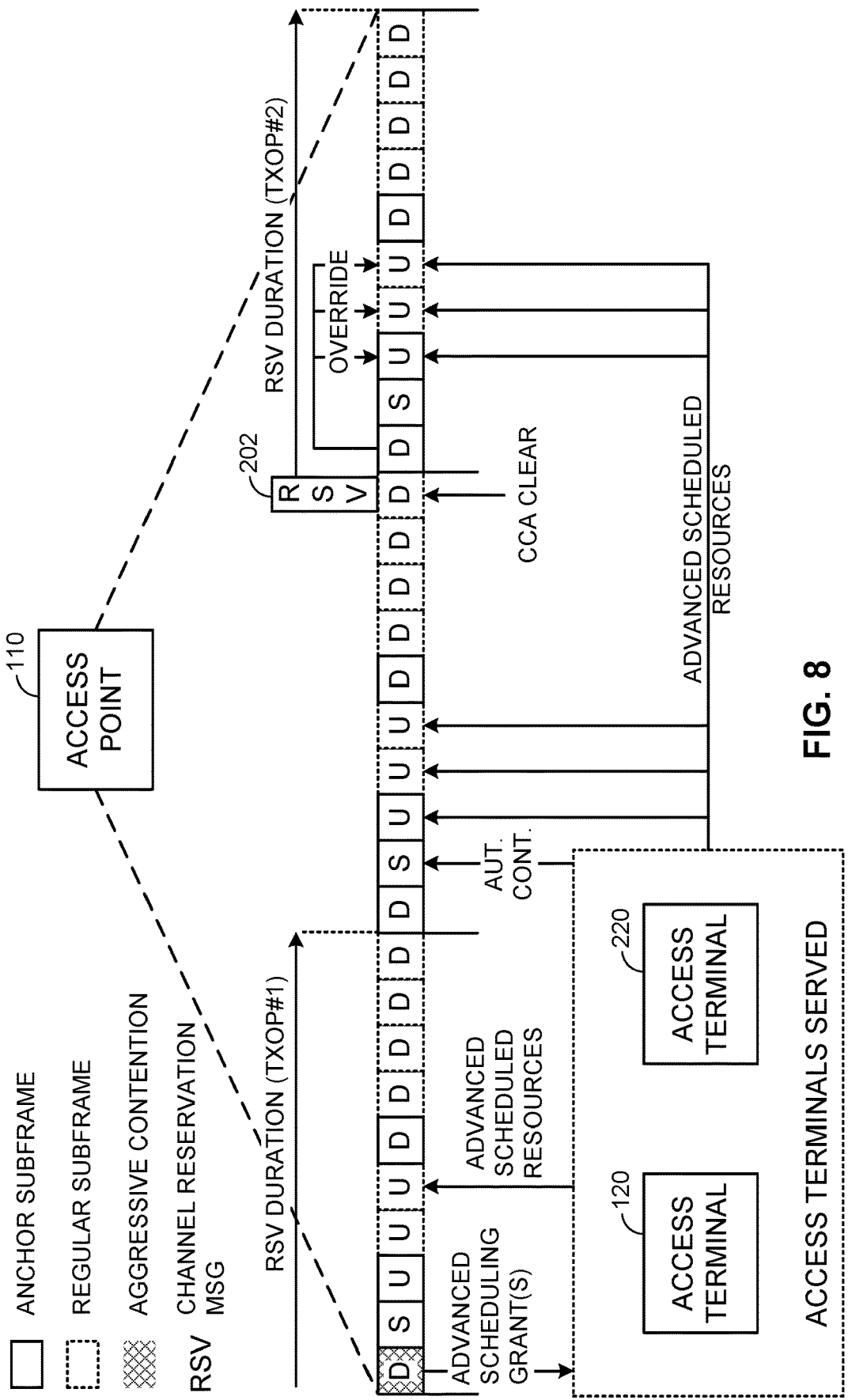
FIG. 8 illustrates an example of advanced scheduling in accordance with a virtual TDD frame structure.

FIG. 8 illustrates an example of advanced scheduling in accordance with a virtual TDD frame structure to facilitate fairness for a centralized-contention scheme. In this example, the access point 110 again contends for access to the communication medium 140 to schedule uplink traffic for both the access terminal 120 and the access terminal 220.

Initially, the access point 110 sends an advanced scheduling grant to each of the access terminals 120 and 220 to allocate a set of upcoming time, frequency, and/or encoding (e.g., Modulation and Coding Scheme (MCS)) resources for the access terminals 120 and 220 for their respective uplink traffic. The scheduling grants may be semi-persistent in that they may assign resources for several TXOPs into the future, either indefinitely on a recurring basis or for a predetermined period of time. In some designs, the scheduling grants may include an expiration period associated with the allocated set of resources. The scheduling grants may be sent during an earlier downlink subframe for which the access point 110 may have successfully contended for access to the communication medium 140. The contention here may use regular contention parameters or relatively aggressive contention parameters as described above (e.g., controlling the contention window, etc.). As shown, the scheduling grants may either fall inside the original reservation by the access point 110 or extend outside of it.

In this way, the access terminals 120 and 220 may know a priori which resources to use for their respective transmissions, and may therefore autonomously contend for access to the communication medium 140, independently from the access point 110. This allows the access terminals 120 and 220 to contend in proportion to their number and also mitigates the impact of processing delays. In the illustrated example, the access point 110 re-contends but is unsuccessful and therefore unable to gain access to the communication medium 140 for an initial period of time following the advanced scheduling grants. However, one or more of the access terminals 120 and 220 may itself be able to gain access to the communication medium 140 during this time as part of its own autonomous contention process. Because both the access terminals 120 and 220 and the access point 110 know a priori which resources to use or expect for transmission, the access terminals 120 and 220 may still transmit their respective uplink traffic for whichever uplink subframe(s) they are able to access the communication medium 140, even though the access point 110 may not be able to do so.

At a later time, the access point 110 may be able to regain access to the communication medium 140 and may broadcast a channel reservation message to reserve it for a desired period of time (e.g., the remainder of the life of the scheduling grants). Moreover, upon regaining access to the communication medium 140, the access point 110 may override the advanced scheduling grants with new scheduling grants to reflect changes in the operating environment or uplink traffic demand, which helps to retain scheduling flexibility.

Figure 9:
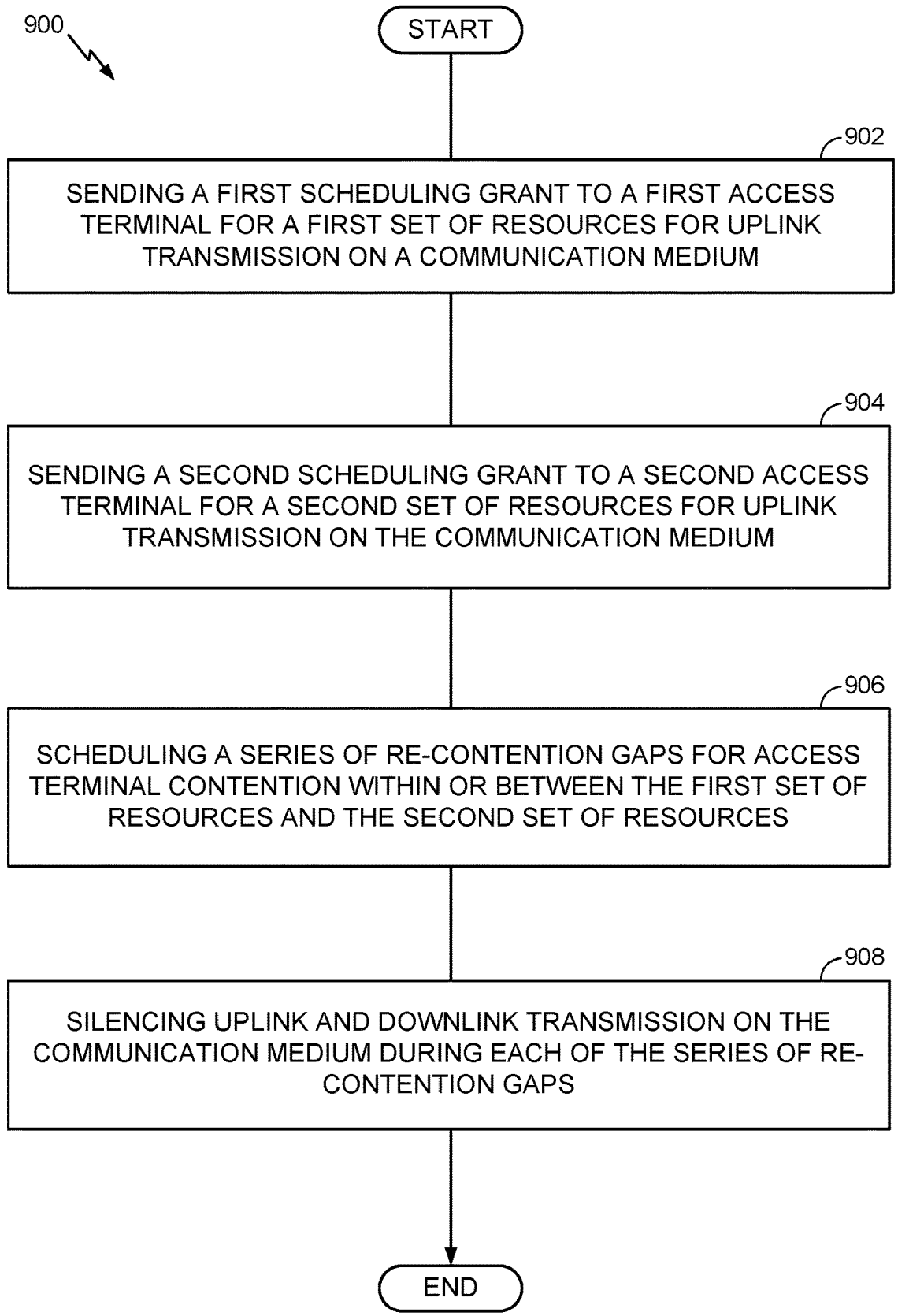
FIG. 9 is a flow diagram illustrating an example method of communication in accordance with the techniques described herein.

FIG. 9 is a flow diagram illustrating an example method of communication in accordance with the techniques described above. The method 900 may be performed, for example, by an access point (e.g., the access point 110 illustrated in FIG. 1) operating on a shared communication medium. As an example, the communication medium may include one or more time, frequency, or space resources on an unlicensed radio frequency band shared between LTE technology and Wi-Fi technology devices.

As shown, the access point may send a first scheduling grant to a first access terminal for a first set of resources for uplink transmission on a communication medium (block 902). The access point may also send a second scheduling grant to a second access terminal for a second set of resources for uplink transmission on the communication medium (block 904). The access point may schedule a series of re-contention gaps for access terminal contention within or between the first set of resources and the second set of resources (block 906) and silence uplink and downlink transmission on the communication medium during each of the series of re-contention gaps (block 908). A corresponding schedule of the re-contention gaps may be included in at least one of the first or second scheduling grants.

As discussed in more detail above, the silencing (block 908) may comprise, for example, muting one or more symbol periods of an uplink subframe. In addition or as an alternative, the silencing (block 908) may also comprise advertising an SRS gap during one or more symbol periods of an uplink subframe but configuring no access terminals for SRS transmission during the one or more symbol periods.

In some designs, the first set of resources and the second set of resources may be time division multiplexed in respective symbol periods, with the re-contention gaps being scheduled to occur between one or more symbol periods associated with the first set of resources and one or more symbol periods associated with the second set of resources. In other designs, the first set of resources and the second set of resources may be frequency division multiplexed in one or more common symbol periods, with the re-contention gaps being scheduled to occur within the first set of resources and the second set of resources.

In still other designs, the first set of resources and the second set of resources may be overlapping in time and frequency. Here, the access point may prioritize the first access terminal over the second access terminal with respect to contending for access to the communication medium during at least one of the series of re-contention gaps. For example, such a prioritizing may comprise sending a first set of one or more contention parameters to the first access terminal and sending a second set of one or more contention parameters to the second access terminal, with the first set of one or more contention parameters defining a smaller variable space for a randomly selected contention window size than the second set of one or more contention parameters. As another example, the prioritizing may comprise determining a first randomly selected contention window size for the first access terminal in accordance with a first set of one or more contention parameters and determining a second randomly selected contention window size for the second access terminal in accordance with a second set of one or more contention parameters, with the first set of one or more contention parameters defining a smaller variable space for a randomly selected contention window size than the second set of one or more contention parameters. The access point may then send the first and second contention window sizes to the first and second access terminals, respectively.

Figure 10:
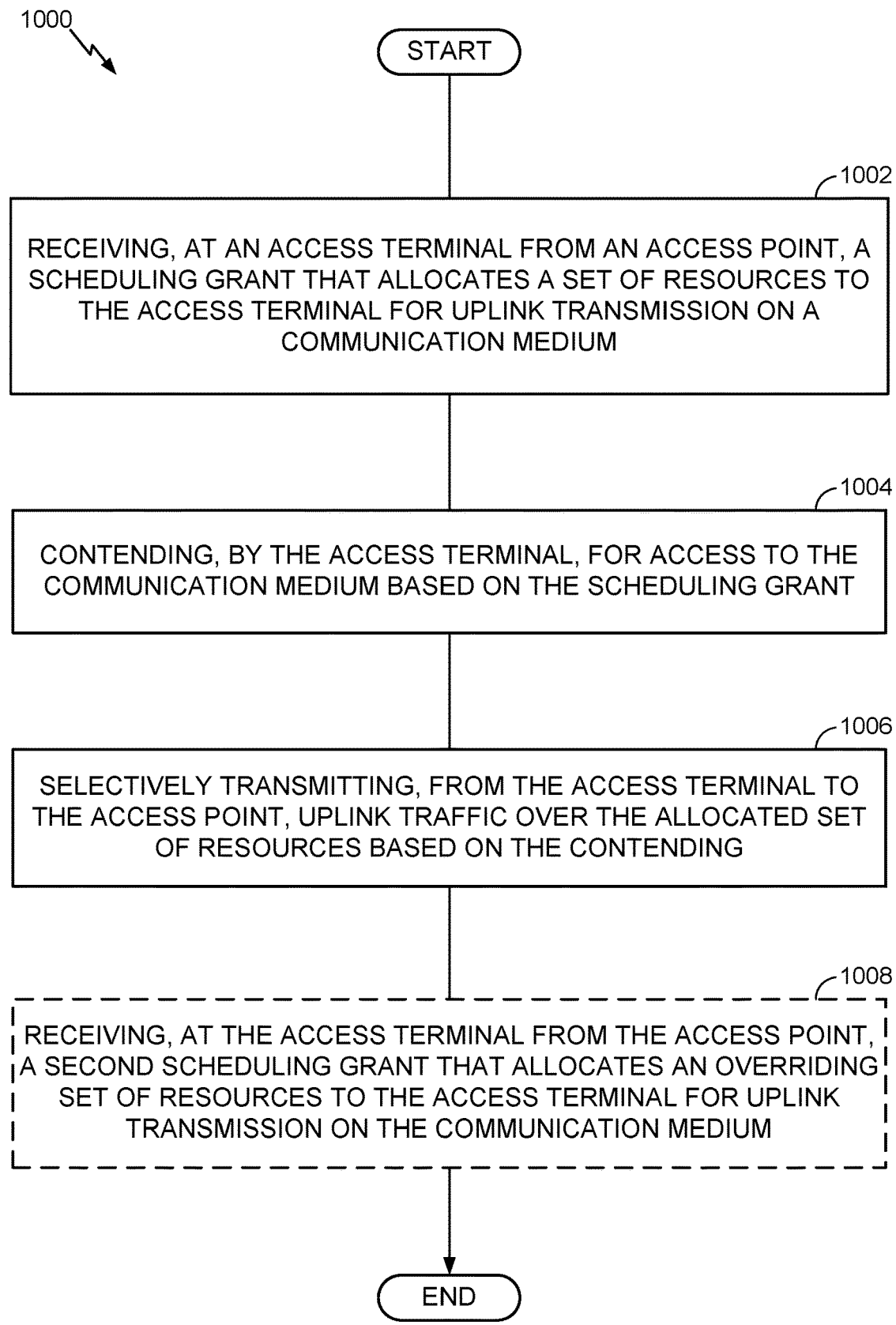
FIG. 10 is a flow diagram illustrating another example method of communication in accordance with the techniques described herein.

FIG. 10 is a flow diagram illustrating another example method of communication in accordance with the techniques described above. The method 1000 may be performed, for example, by an access terminal (e.g., the access terminal 120 illustrated in FIG. 1) operating on a shared communication medium. As an example, the communication medium may include one or more time, frequency, or space resources on an unlicensed radio frequency band shared between LTE technology and Wi-Fi technology devices.

As shown, the access terminal may receive, from an access point, a scheduling grant that allocates a set of resources to the access terminal for uplink transmission on a communication medium (block 1002). The access terminal may then contend for access to the communication medium based on the scheduling grant (block 1004). The access terminal may then selectively transmit, to the access point, uplink traffic over the allocated set of resources based on the contending.

As discussed in more detail above, the scheduling grant may allocate upcoming time and frequency resources to the access terminal over a plurality of TXOPs. The scheduling grant may also include an indication of a modulation and coding scheme. In some designs, the scheduling grant may include an expiration period associated with the allocated set of resources.

Returning to FIG. 10, the access terminal may also receive, from the access point, a second scheduling grant that allocates an overriding set of resources to the access terminal for uplink transmission on the communication medium (optional block 1308). The second scheduling grant may be received prior to an expiration of the first scheduling grant.

The selectively transmitting (block 1306) may comprise, for example, transmitting the uplink traffic over the allocated set of resources in response to the contending being successful and refraining from transmitting the uplink traffic over the allocated set of resources in response to the contending being unsuccessful. The contending (block 1304) may comprise, for example, contending for access to the communication medium for a first instance of the allocated set of resources and re-contending for access to the communication medium for a second instance of the allocated set of resources.

Figure 11:
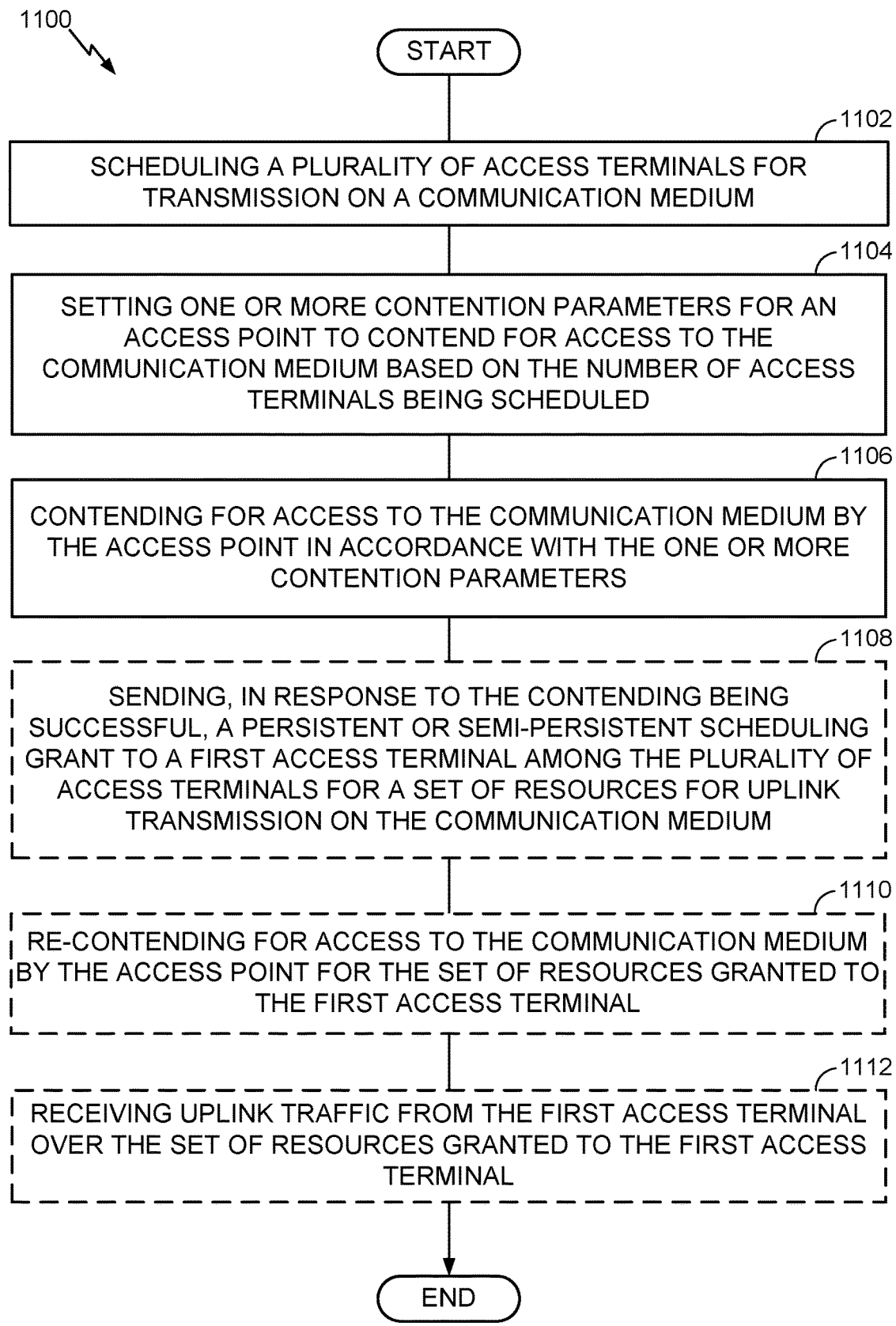
FIG. 11 is a flow diagram illustrating another example method of communication in accordance with the techniques described herein.

FIG. 11 is a flow diagram illustrating another example method of communication in accordance with the techniques described above. The method 1100 may be performed, for example, by an access point (e.g., the access point 110 illustrated in FIG. 1) operating on a shared communication medium. As an example, the communication medium may include one or more time, frequency, or space resources on an unlicensed radio frequency band shared between LTE technology and Wi-Fi technology devices.

As shown, the access point may schedule a plurality of access terminals for transmission on a communication medium (block 1102) and set one or more contention parameters for itself to contend for access to the communication medium based on the number of access terminals being scheduled (block 1104). The access point may then contend for access to the communication medium in accordance with the one or more contention parameters (block 1106).

As discussed in more detail above, the one or more contention parameters may be set to prioritize access for a larger number of access terminals being scheduled as compared to a smaller number of access terminals being scheduled. As an example, the one or more contention parameters may comprise a contention window size, with the setting (block 1104) comprising setting a longer contention window for a smaller number of access terminals being scheduled and a shorter contention window for a larger number of access terminals being scheduled. In some designs, the setting (block 1104) may comprise at least one of: selecting the contention window size directly, selecting a variable space associated with randomly selecting the contention window size, or selecting a minimum value associated with the contention window size.

The access point may also determine a number of other wireless devices contending for access to the communication medium in accordance with a RAT that is different from a RAT utilized by the access terminals, with the setting (block 1104) being further based on the determined number of other wireless devices.

Returning to FIG. 11, the access point may also send, in response to the contending being successful, a persistent or semi-persistent scheduling grant to a first access terminal among the plurality of access terminals for a set of resources for uplink transmission on the communication medium (optional block 1108). The access point may re-contend for access to the communication medium for the set of resources granted to the first access terminal (optional block 1110), but the re-contending may be unsuccessful. Nevertheless, the access point may still receive uplink traffic from the first access terminal over the set of resources granted to the first access terminal (optional block 1112) because the first access terminal may be able to autonomously contend in accordance with the set of resources granted.

In some designs, the scheduling grant may be semi-persistent, with the access point broadcasting a channel reservation message to reserve the communication medium for a period of time covering a remainder of the scheduling grant. The access point may also send a second scheduling grant to the first access terminal for an overriding set of resources for uplink transmission on the communication medium.

For generality, the access point 110 and the access terminal 120 are shown in FIG. 1 only in relevant part as including the medium access manager 112 and the medium access manager 122, respectively. It will be appreciated, however, that the access point 110 and the access terminal 120 may be configured in various ways to provide or otherwise support the inter-access terminal unblocking and advanced contention techniques discussed herein.

Figure 12:
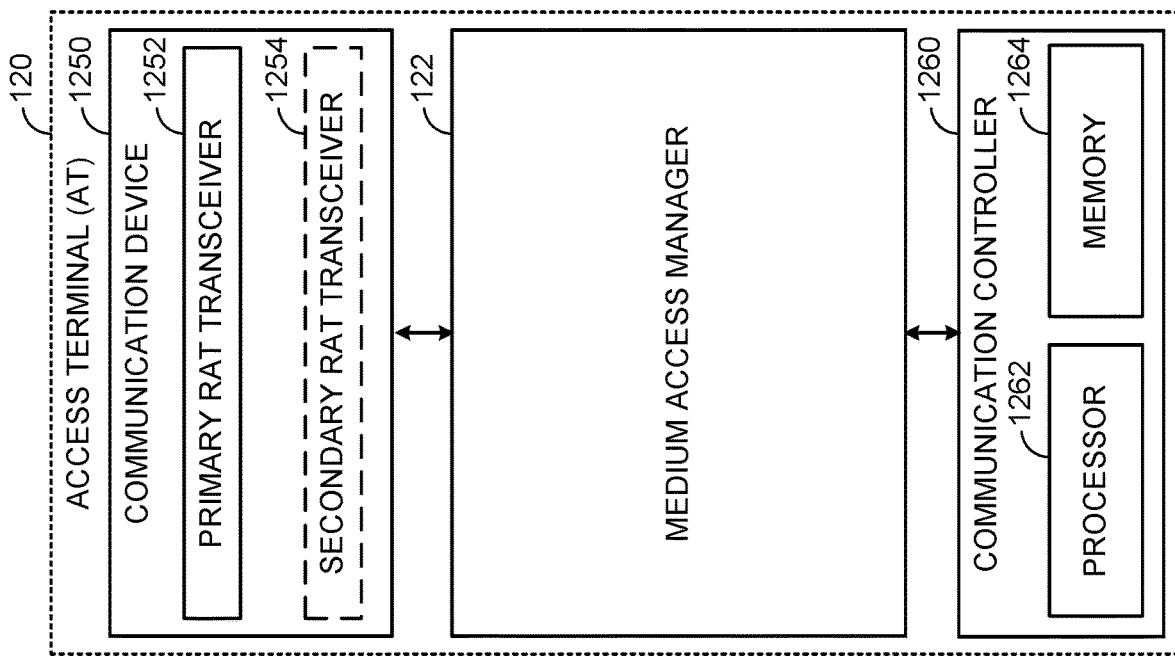
FIG. 12 is a device-level diagram illustrating example components of an access point and an access terminal in more detail.
Figure 12:
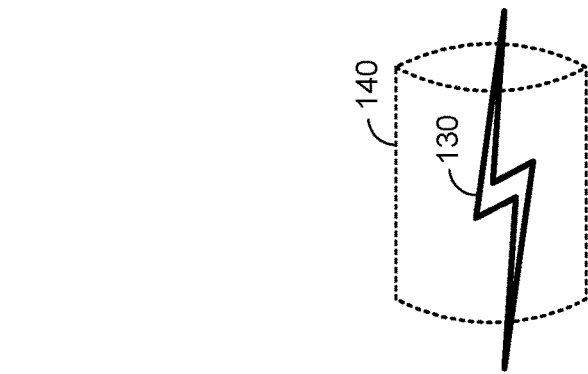
Figure 12:
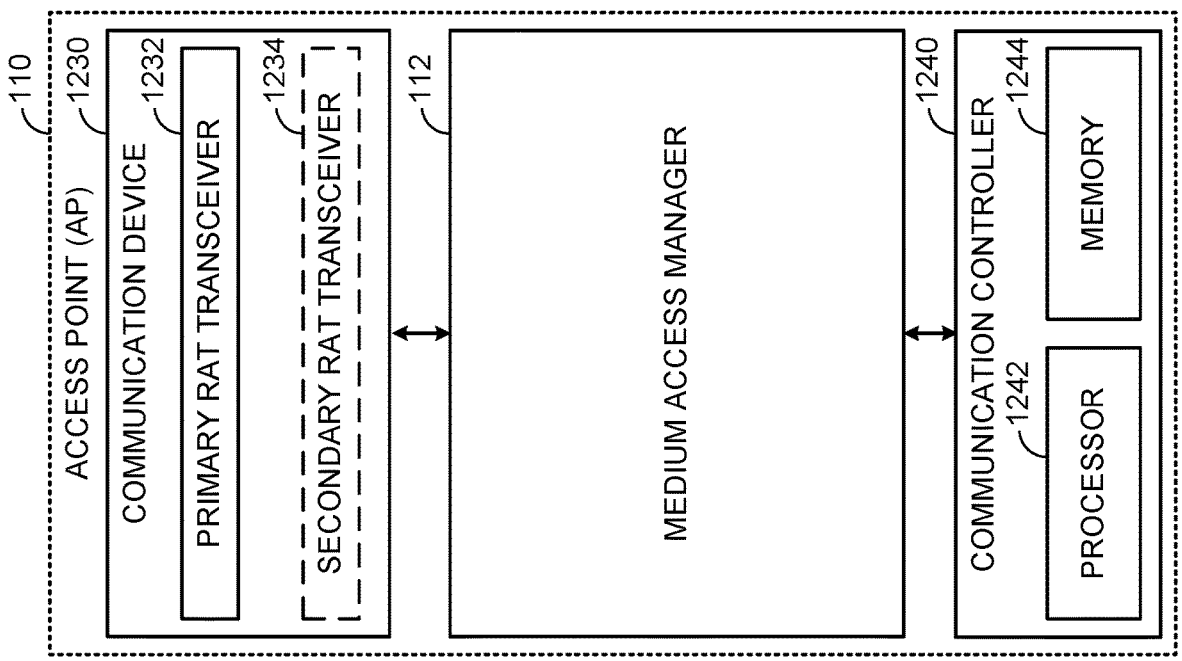

FIG. 12 is a device-level diagram illustrating example components of the access point 110 and the access terminal 120 of the primary RAT system 100 in more detail. As shown, the access point 110 and the access terminal 120 may each generally include a wireless communication device (represented by the communication devices 1230 and 1250) for communicating with other wireless nodes via at least one designated RAT. The communication devices 1230 and 1250 may be variously configured for transmitting and encoding signals, and, conversely, for receiving and decoding signals in accordance with the designated RAT (e.g., messages, indications, information, pilots, and so on).

The communication devices 1230 and 1250 may include, for example, one or more transceivers, such as respective primary RAT transceivers 1232 and 1252, and, in some designs, (optional) co-located secondary RAT transceivers 1234 and 1254, respectively (corresponding, for example, to the RAT employed by the competing RAT system 150). As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a radio chip or similar circuitry providing low-level sniffing only). Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The access point 110 and the access terminal 120 may also each generally include a communication controller (represented by the communication controllers 1240 and 1260) for controlling operation of their respective communication devices 1230 and 1250 (e.g., directing, modifying, enabling, disabling, etc.). The communication controllers 1240 and 1260 may include one or more processors 1242 and 1262, and one or more memories 1244 and 1264 coupled to the processors 1242 and 1262, respectively. The memories 1244 and 1264 may be configured to store data, instructions, or a combination thereof, either as on-board cache memory, as separate components, a combination, etc. The processors 1242 and 1262 and the memories 1244 and 1264 may be standalone communication components or may be part of the respective host system functionality of the access point 110 and the access terminal 120.

It will be appreciated that the medium access manager 112 and the medium access manager 122 may be implemented in different ways. In some designs, some or all of the functionality associated therewith may be implemented by or otherwise at the direction of at least one processor (e.g., one or more of the processors 1242 and/or one or more of the processors 1262) and at least one memory (e.g., one or more of the memories 1244 and/or one or more of the memories 1264). In other designs, some or all of the functionality associated therewith may be implemented as a series of interrelated functional modules.

Figure 13:
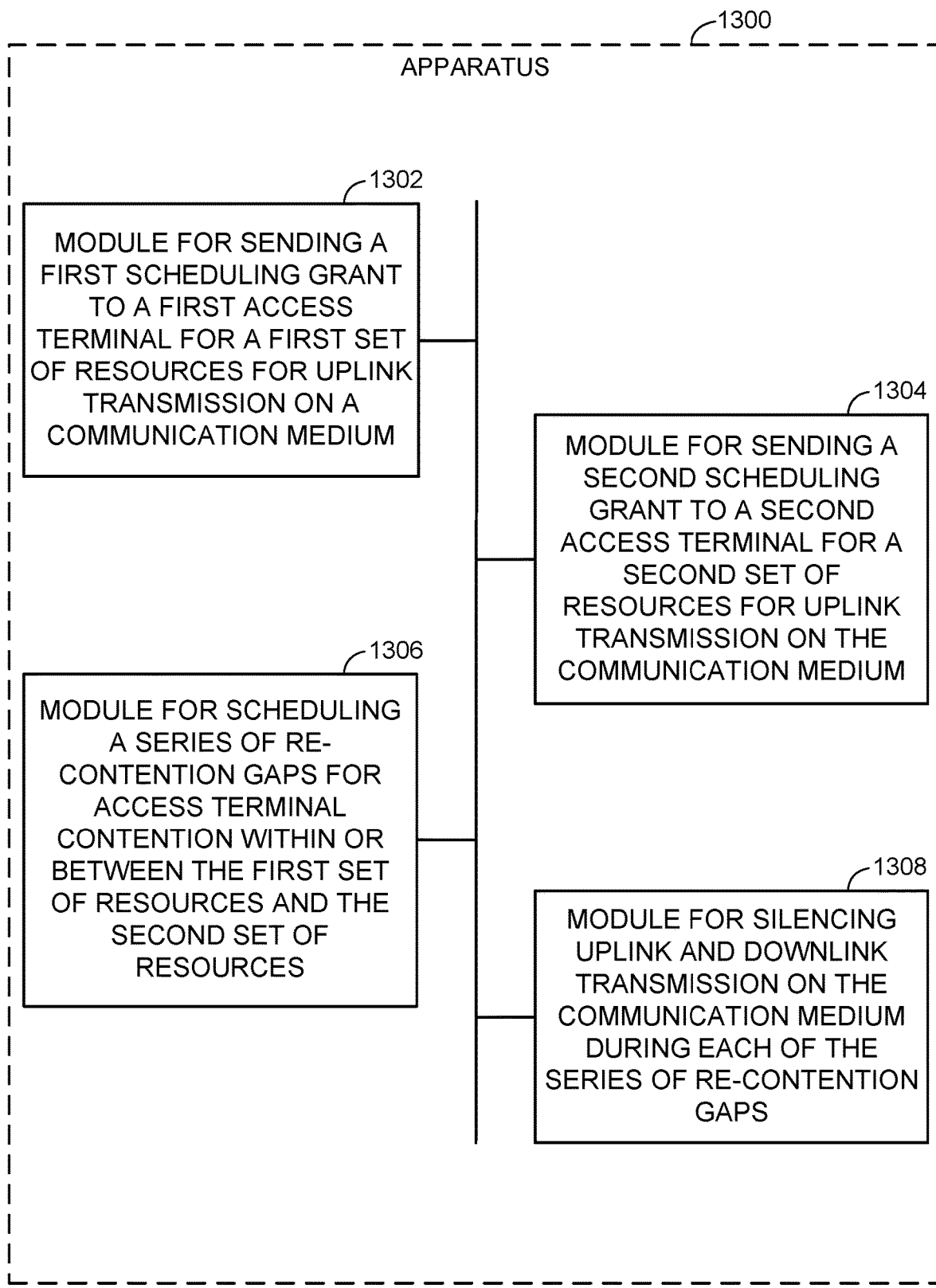
FIG. 13 illustrates an example apparatus represented as a series of interrelated functional modules.

FIG. 13 illustrates an example apparatus for implementing the medium access manager 112 represented as a series of interrelated functional modules. In the illustrated example, the apparatus 1300 includes a module for sending 1302, a module for sending 1304, a module for scheduling 1306, and a module for silencing 1308.

The module for sending 1302 may be configured to send a first scheduling grant to a first access terminal for a first set of resources for uplink transmission on a communication medium. The module for sending 1304 may be configured to send a second scheduling grant to a second access terminal for a second set of resources for uplink transmission on the communication medium. The module for scheduling 1306 may be configured to schedule a series of re-contention gaps for access terminal contention within or between the first set of resources and the second set of resources. The module for silencing 1308 may be configured to silence uplink and downlink transmission on the communication medium during each of the series of re-contention gaps.

Figure 14:
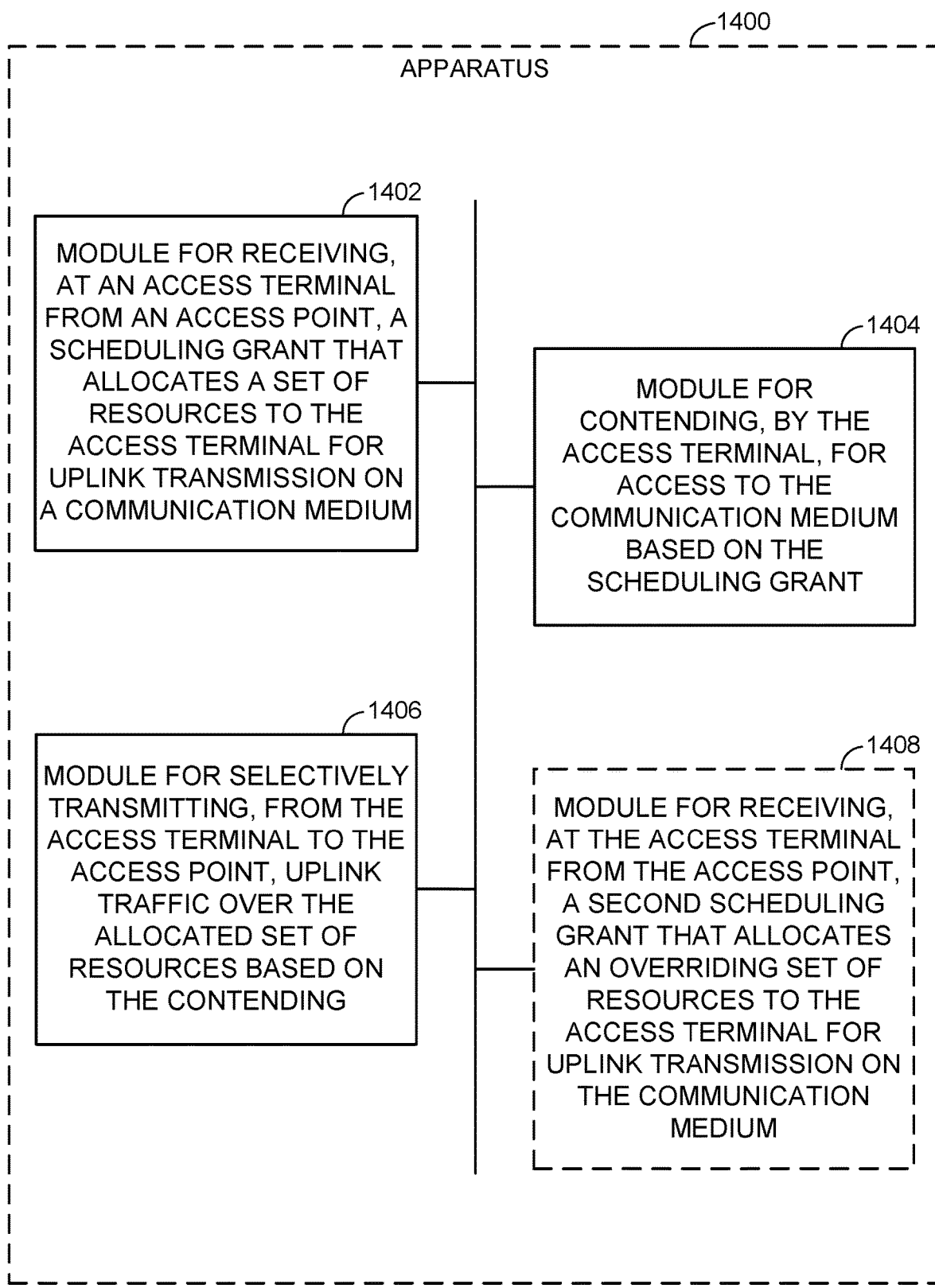
FIG. 14 illustrates another example apparatus represented as a series of interrelated functional modules.

FIG. 14 illustrates another example apparatus for implementing the medium access manager 122 represented as a series of interrelated functional modules. In the illustrated example, the apparatus 1400 includes a module for receiving 1402, a module for contending 1404, a module for selectively transmitting 1406, and an (optional) module for receiving 1408.

The module for receiving 1402 may be configured to receive, at an access terminal from an access point, a scheduling grant that allocates a set of resources to the access terminal for uplink transmission on a communication medium. The module for contending 1404 may be configured to contend, by the access terminal, for access to the communication medium based on the scheduling grant. The module for selectively transmitting 1406 may be configured to selectively transmit, from the access terminal to the access point, uplink traffic over the allocated set of resources based on the contending. The (optional) module for receiving 1408 may be configured to receive, at the access terminal from the access point, a second scheduling grant that allocates an overriding set of resources to the access terminal for uplink transmission on the communication medium.

Figure 15:
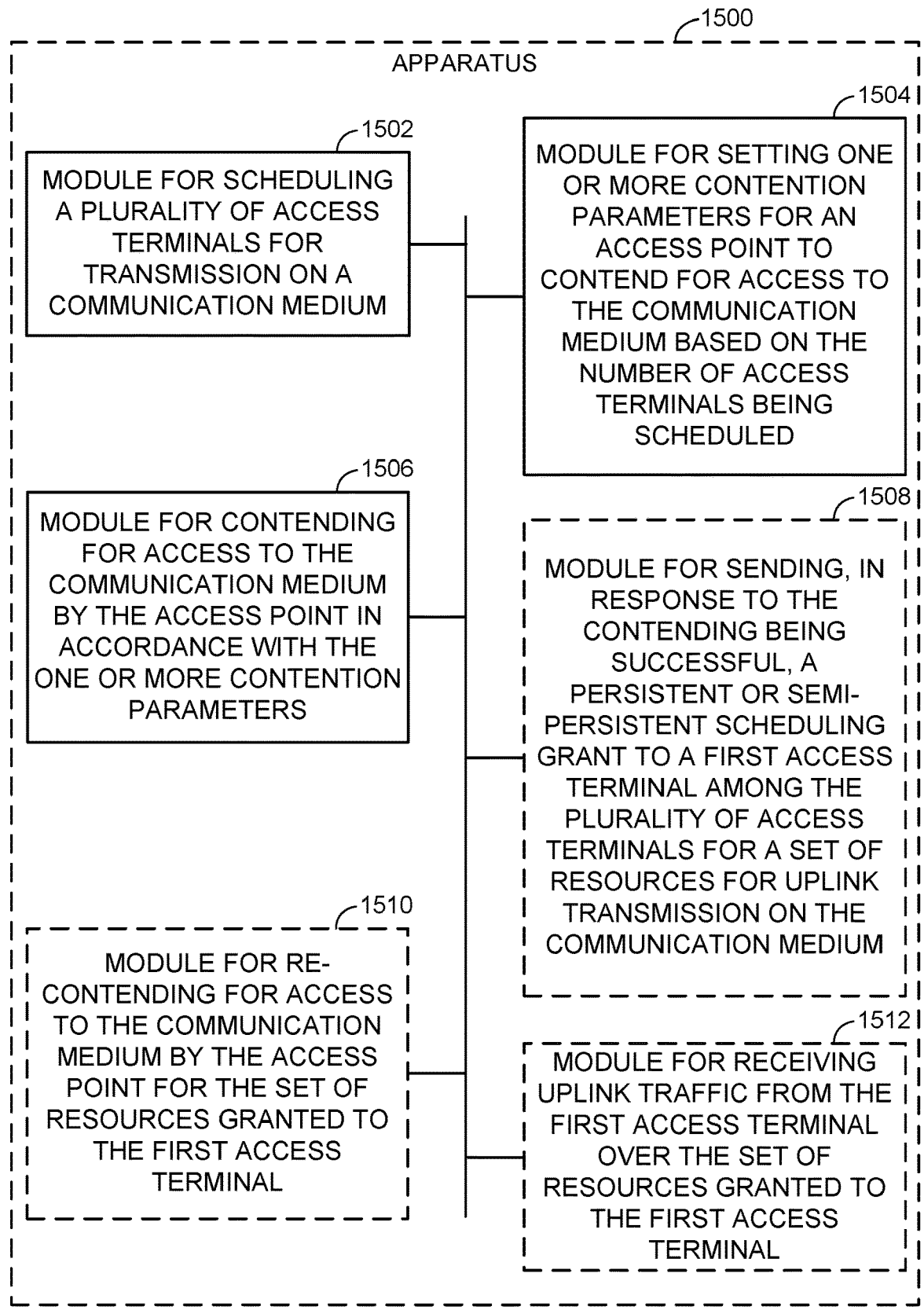
FIG. 15 illustrates another example apparatus represented as a series of interrelated functional modules.

FIG. 15 illustrates another example apparatus for implementing the medium access manager 112 represented as a series of interrelated functional modules. In the illustrated example, the apparatus 1500 includes a module for scheduling 1502, a module for setting 1504, a module for contending 1506, an (optional) module for sending 1508, an (optional) module for re-contending 1510, and an (optional) module for receiving 1512.

The module for scheduling 1502 may be configured to schedule a plurality of access terminals for transmission on a communication medium. The module for setting 1504 may be configured to set one or more contention parameters for the access point to contend for access to the communication medium based on the number of access terminals being scheduled. The module for contending 1506 may be configured to contend for access to the communication medium in accordance with the one or more contention parameters.

The (optional) module for sending 1508 may be configured to send, in response to the contending being successful, a persistent or semi-persistent scheduling grant to a first access terminal among the plurality of access terminals for a set of resources for uplink transmission on the communication medium. The (optional) module for re-contending 1510 may be configured to re-contend for access to the communication medium for the set of resources granted to the first access terminal, but the re-contending may be unsuccessful. The (optional) module for receiving 1512 may be nevertheless configured to receive uplink traffic from the first access terminal over the set of resources granted to the first access terminal.

The functionality of the modules of FIGS. 13-15 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 13-15, as well as other components and functions described herein, may be implemented using any suitable means. Such means also may be implemented, at least in part, using corresponding structure as taught herein. For example, the components described above in conjunction with the "module for" components of FIGS. 13-15 also may correspond to similarly designated "means for" functionality. Thus, in some aspects one or more of such means may be implemented using one or more of processor components, integrated circuits, or other suitable structure as taught herein, including as an algorithm. One skilled in the art will recognize in this disclosure an algorithm represented in the prose described above, as well in sequences of actions that may be represented by pseudocode. For example, the components and functions represented by FIGS. 13-15 may include code for performing a LOAD operation, a COMPARE operation, a RETURN operation, an IF-THEN-ELSE loop, and so on.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a transitory or non-transitory computer-readable medium embodying a method for communication.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A communication method, comprising:
    sending a first scheduling grant to a first access terminal for a first set of resources for uplink transmission on a communication medium;
    sending a second scheduling grant to a second access terminal for a second set of resources for uplink transmission on the communication medium;
    scheduling a series of re-contention gaps for access terminal contention within or between the first set of resources and the second set of resources, wherein a corresponding schedule of the re-contention gaps is included in at least one of the first or second scheduling grants; and
    silencing uplink and downlink transmission on the communication medium during each of the series of re-contention gaps.

2. A communication method, comprising:
    receiving, at a first access terminal, a first scheduling grant that allocates a first set of allocated resources to the first access terminal for uplink transmission on a communication medium, wherein the first scheduling grant comprises a first plurality of sub-frames allocated for uplink transmission and at least one re-contention gap for access terminal contention, wherein each of the at least one re-contention gaps is less than a sub-frame;
    contending, by the first access terminal, for access to the communication medium during one of the at least one re-contention gaps; and
    selectively transmitting, from the first access terminal, uplink traffic over the allocated first set of resources based on the contending.

3. The method of claim 2, wherein the first scheduling grant is received from an access point;
    wherein a second scheduling grant that comprises at least one re-contention gap is provided to a second access terminal by the access point; and
    wherein the contending, by the first access terminal, comprises:
        contending, by the first access terminal, for access to the communication medium during the at least one re-contention gap of the first scheduling grant located between an uplink transmission by the second access terminal and the uplink traffic transmitted by the first access terminal.

4. The method of claim 2, wherein the first scheduling grant comprises an indication to silence uplink communications on the communication medium during the at least one re-contention gap.

5. The method of claim 2, wherein the receiving the first scheduling grant comprises:
    receiving the first scheduling grant during a first transmission opportunity (TXOP);
    wherein the first plurality of sub-frames allocated for uplink transmission and the at least one re-contention gap comprise time and frequency resources in a future TXOP.

6. The method of claim 5, wherein the first scheduling grant allocates upcoming time and frequency resources to the first access terminal over a plurality of transmission opportunities (TXOPs).

7. The method of claim 2, wherein the first scheduling grant further comprises an indication of a modulation and a coding scheme.

8. The method of claim 2, wherein the at least one re-contention gap is configured based on a timing offset of a second scheduling grant.

9. The method of claim 2, wherein the selectively transmitting comprises:
   transmitting the uplink traffic over the allocated first set of resources in response to the contending being successful; and
   refraining from transmitting the uplink traffic over the allocated first set of resources in response to the contending being unsuccessful.

10. The method of claim 2, wherein the contending comprises:
    contending for access to the communication medium for a first instance of the allocated first set of resources; and
    re-contending for access to the communication medium for a second instance of the allocated first set of resources.

11. An access terminal comprising:
    a memory;
    an antenna configured to transmit and receive wireless signals;
    a processor coupled to the antenna and the memory, the processor configured to:
      receive a first scheduling grant that allocates a first set of allocated resources to the access terminal for uplink transmission on a communication medium, wherein the first scheduling grant comprises a first plurality of sub-frames allocated for uplink transmission and at least one re-contention gap for access terminal contention, wherein each of the at least one re-contention gaps is less than a sub-frame;
      contend for access to the communication medium during one of the at least one re-contention gaps; and
      selectively transmit uplink traffic over the allocated first set of resources based on the contend.

12. The access terminal of claim 11, wherein the first scheduling grant is received from an access point;
    wherein a second scheduling grant that comprises at least one re-contention gap is provided to a second access terminal by the access point; and
    wherein the contend comprises:
      contend for access to the communication medium during the at least one re-contention gap of the first scheduling grant located between an uplink transmission by the second access terminal and the uplink traffic transmitted by the access terminal.

13. The access terminal of claim 11, wherein the first scheduling grant comprises an indication to silence uplink communications on the communication medium during the at least one re-contention.

14. The access terminal of claim 11, wherein the receive the first scheduling grant comprises the processor being further configured to:
    receive the first scheduling grant during a first transmission opportunity (TXOP);
    wherein the first plurality of sub-frames allocated for uplink transmission and the at least one re-contention gap comprise time and frequency resources in a future TXOP.

15. The access terminal of claim 14, wherein the first scheduling grant allocates upcoming time and frequency resources to the access terminal over a plurality of transmission opportunities (TXOPs).

16. The access terminal of claim 11, wherein the first scheduling grant further comprises an indication of a modulation and a coding scheme.

17. The access terminal of claim 11, wherein the at least one re-contention gap is configured based on a timing offset of a second scheduling grant.

18. The access terminal of claim 11, wherein the selectively transmit comprises the processor being further configured to:
    transmit the uplink traffic over the allocated first set of resources in response to the contend being successful; and
    refrain from transmitting the uplink traffic over the allocated first set of resources in response to the contend being unsuccessful.

19. The access terminal of claim 11, wherein the contend comprises the processor being further configured to:
    contend for access to the communication medium for a first instance of the allocated first set of resources; and
    re-contend for access to the communication medium for a second instance of the allocated first set of resources.

* * * * *